(12) United States Patent
Park et al.

(10) Patent No.: US 10,862,113 B2
(45) Date of Patent: Dec. 8, 2020

(54) CATHODE ACTIVE MATERIAL, SECONDARY BATTERY COMPRISING THE SAME, AND METHOD OF MANUFACTURING THE POSITIVE ACTIVE MATERIAL

(71) Applicant: Samsung Electronics Co., Ltd., Suwon-si (KR)

(72) Inventors: Kwangjin Park, Seongnam-si (KR); Jaegu Yoon, Suwon-si (KR); Jeongkuk Shon, Hwaseong-si (KR); Minsang Song, Seongnam-si (KR); Jaejun Chang, Seoul (KR); Sangmin Ji, Suwon-si (KR); Jaeman Choi, Hwaseong-si (KR); Dongjin Ham, Hwaseong-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 310 days.

(21) Appl. No.: 15/922,139

(22) Filed: Mar. 15, 2018

(65) Prior Publication Data
US 2018/0205077 A1 Jul. 19, 2018

Related U.S. Application Data

(63) Continuation of application No. 14/576,962, filed on Dec. 19, 2014, now Pat. No. 9,960,419.

(30) Foreign Application Priority Data

Nov. 19, 2014 (KR) ........................ 10-2014-0161630

(51) Int. Cl.
| | | |
|---|---|---|
| H01M 4/36 | (2006.01) | |
| H01M 4/583 | (2010.01) | |
| H01M 4/505 | (2010.01) | |
| C01G 49/00 | (2006.01) | |
| C01G 53/00 | (2006.01) | |
| H01M 4/485 | (2010.01) | |
| H01M 4/525 | (2010.01) | |
| C01G 51/04 | (2006.01) | |
| C01G 51/00 | (2006.01) | |
| C01G 45/12 | (2006.01) | |
| C01G 45/02 | (2006.01) | |
| H01M 10/052 | (2010.01) | |
| H01M 4/02 | (2006.01) | |

(52) U.S. Cl.
CPC ........ *H01M 4/366* (2013.01); *C01G 49/0072* (2013.01); *C01G 53/50* (2013.01); *H01M 4/485* (2013.01); *H01M 4/505* (2013.01); *H01M 4/525* (2013.01); *H01M 4/583* (2013.01); *C01G 45/02* (2013.01); *C01G 45/1228* (2013.01); *C01G 51/04* (2013.01); *C01G 51/50* (2013.01); *C01P 2002/76* (2013.01); *C01P 2002/85* (2013.01); *C01P 2004/03* (2013.01); *C01P 2004/04* (2013.01); *C01P 2004/80* (2013.01); *C01P 2006/40* (2013.01); *H01M 10/052* (2013.01); *H01M 2004/028* (2013.01)

(58) Field of Classification Search
CPC ...... H01M 4/366; H01M 4/583; H01M 4/505; H01M 4/525; H01M 4/485; H01M 10/052; H01M 2004/028; C01G 49/0072; C01G 53/50
See application file for complete search history.

(56) References Cited

U.S. PATENT DOCUMENTS

| | | |
|---|---|---|
| 7,108,944 B2 | 9/2006 | Kweon et al. |
| 7,883,798 B2 | 2/2011 | Kweon et al. |
| 7,939,218 B2 | 5/2011 | Niu |
| 7,951,491 B2 | 5/2011 | Tokunaga et al. |
| 9,331,338 B2 | 5/2016 | Hwang et al. |
| 2008/0187838 A1 | 8/2008 | Le |
| 2011/0183169 A1 | 7/2011 | Bhardwaj et al. |
| 2012/0276450 A1 | 11/2012 | Chen et al. |
| 2012/0301784 A1 | 11/2012 | Yano et al. |
| 2013/0040201 A1 | 2/2013 | Manthiram et al. |
| 2013/0083496 A1 | 4/2013 | Franklin et al. |
| 2013/0108907 A1 | 5/2013 | Bhardwaj et al. |
| 2014/0079979 A1 | 3/2014 | Kwon et al. |
| 2014/0170467 A1 | 6/2014 | Kwon et al. |
| 2015/0004491 A1* | 1/2015 | Yoshiwara ............ H01M 4/525 429/221 |

(Continued)

FOREIGN PATENT DOCUMENTS

| | | |
|---|---|---|
| JP | 2007123255 A | 5/2007 |
| JP | 4768562 B2 | 6/2011 |
| KR | 10-0542184 B1 | 1/2006 |

(Continued)

OTHER PUBLICATIONS

Kwon et al.,"Carbon-coated mesoporous silica as an electrode material", Microporous and Mesoporous Materials 132, 2010, pp. 421-427.

(Continued)

*Primary Examiner* — Laura Weiner

(74) *Attorney, Agent, or Firm* — Cantor Colburn LLP

(57) ABSTRACT

A positive active material including: a core comprising a metal oxide, a non-metal oxide, or a combination thereof capable of intercalation and deintercalation of lithium ions or sodium ions; and a non-conductive carbonaceous film including oxygen on at least one portion of a surface of the core; a lithium battery including the positive active material; and a method of manufacturing the positive active material.

11 Claims, 15 Drawing Sheets

(56) References Cited

U.S. PATENT DOCUMENTS

2015/0072204 A1    3/2015  Kwon et al.

FOREIGN PATENT DOCUMENTS

| KR | 20060105775 | 10/2006 |
| KR | 20060105775 A | 10/2006 |
| KR | 100824931 B1 | 4/2008 |
| KR | 1020130032818 A | 4/2013 |
| KR | 101265195 B1 | 5/2013 |
| KR | 101309149 B1 | 9/2013 |
| KR | 1020140035689 A | 3/2014 |
| KR | 1020140061955 A | 5/2014 |
| KR | 1020140077622 A | 6/2014 |

OTHER PUBLICATIONS

Nishihara et al., "Carbon-coated mesoporous silica with hydrophobicity and electrical conductivity", Carbon, 46, 2008, pp. 48-53.

* cited by examiner

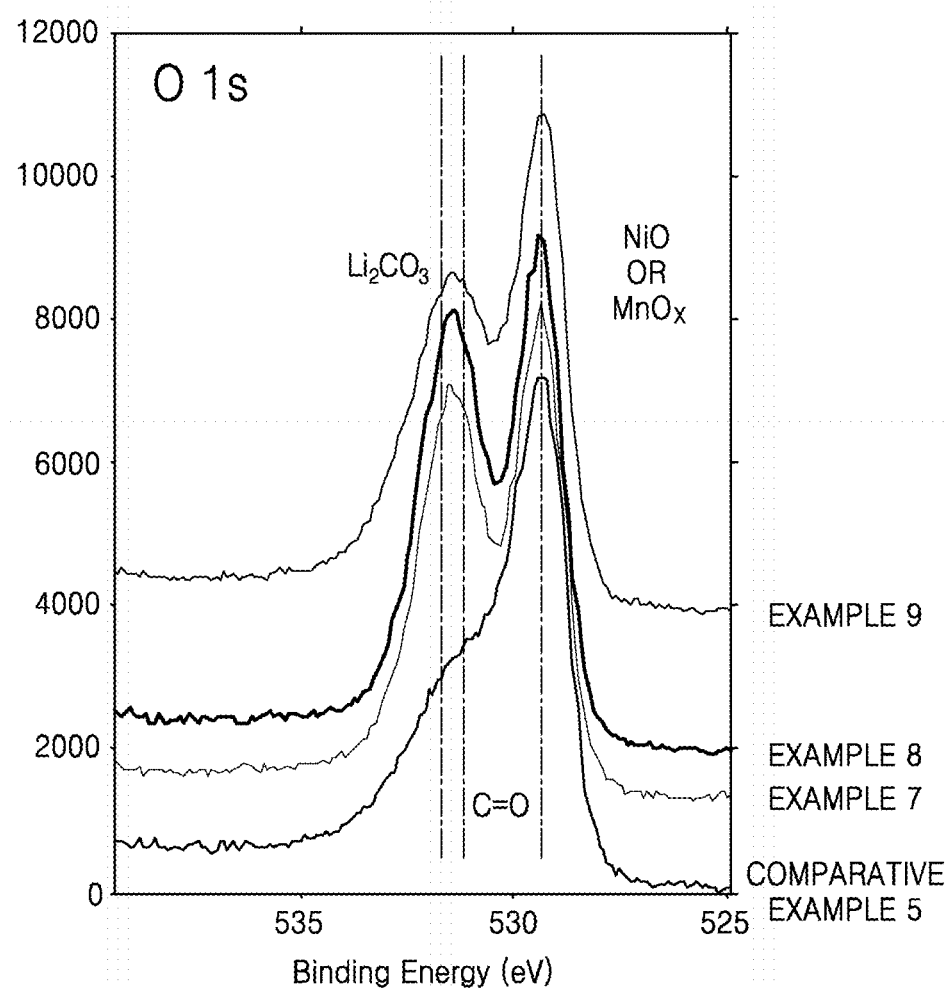

CATHODE ACTIVE MATERIAL, SECONDARY BATTERY COMPRISING THE SAME, AND METHOD OF MANUFACTURING THE POSITIVE ACTIVE MATERIAL

CROSS-REFERENCE TO RELATED APPLICATIONS

This application is a continuation application of application Ser. No. 14/576,962, filed Dec. 19, 2014, which claims priority to and the benefit of Korean Patent Application No. 10-2014-0161630, filed on Nov. 19, 2014, in the Korean Intellectual Property Office, and all the benefits accruing therefrom under 35 U.S.C. § 119, the contents of which are incorporated herein in their entirety by reference.

BACKGROUND

1. Field

The present disclosure relates to positive active materials, secondary batteries including the positive active materials, and methods of manufacturing the secondary batteries, and more particularly, to positive active materials having improved initial efficiency, capacity, and lifespan characteristics, secondary batteries including the positive active materials, and methods of manufacturing the positive active materials.

2. Description of the Related Art

With the reduced weight and increased functionality of mobile electronic devices such as laptop computers, video cameras, and mobile phones, batteries used as a driving energy source of such devices are also increased in terms of capacity and energy density. Therefore, there is an increasing need for secondary batteries that may be reversibly charged and discharged and used multiple times.

Among secondary batteries, lithium ion batteries (LiB) and/or sodium ion batteries using sodium ions have been used as power sources for many mobile devices due to their high energy densities and ease of design. Recently, LiBs and/or sodium ion batteries have been used as power supplies for electric vehicles and power storage in addition to mobile IT devices, and thus, research has been expanded to LiB materials appropriate for manufacturing LiBs and/or sodium ion batteries with high energy density and long lifespan.

Regarding the LiB materials, when a method of coating a positive electrode surface by using a coating material is used, the battery performance may be improved to a satisfactory level since a positive active material is easily modified while using a conventional positive active material.

An electrochemically stable oxide or phosphate is widely used as a coating material in such a coating method. The coating material blocks a direct contact between the positive electrode surface and an electrolyte to inhibit leakage of ions due to the contact with the electrolyte, dissolution of oxygen ions of a positive electrode oxide, or the like in order to improve the structural stability and thermal stability of the positive active material.

However, the method of coating the positive electrode surface by using the coating material such as the electrochemically stable oxide or phosphate may decrease the specific capacity and active reaction surface area of the LiB due to the addition of the coating material that does not directly participate in a charge and discharge reaction, which may cause an increase in the interface resistance between the positive active material and the coating material and a decrease in the high rate charge and discharge characteristics.

Also, due to recent increased demand for high energy density batteries, research on high voltage positive active materials has been actively performed. Accordingly, research on coating materials that inhibit the oxidation of an electrolyte on a high voltage positive active material surface is further needed.

Accordingly, there is still a demand for a positive active material having improved initial efficiency, capacity, and lifespan characteristics at a high voltage, a secondary battery including the positive active material, and a method of manufacturing the positive active material.

SUMMARY

Provided are positive active materials having improved initial efficiency, capacity, and lifespan characteristics.

Provided are secondary batteries including the positive active materials.

Provided are methods of preparing positive active materials having improved initial efficiency, capacity, and lifespan characteristics.

Additional aspects will be set forth in part in the description which follows and, in part, will be apparent from the description, or may be learned by practice of the presented embodiments.

According to an aspect, provided is a positive active material including a core including a metal oxide, a non-metal oxide, or a combination thereof capable of intercalation and deintercalation of lithium ions or sodium ions; and a non-conductive carbonaceous film containing oxygen on at least one portion of a surface of the core.

The non-conductive carbonaceous film may include at least one carbon compound having a functional group of the formula —C(=O)$R_a$, —C(=O)O$R_a$, and —OC(=O)O$R_a$, wherein $R_a$ is hydrogen, a $C_1$-$C_{10}$ alkyl group, or a $C_6$-$C_{20}$ aryl group.

The carbon compound may include a substituted or unsubstituted $C_6$-$C_{30}$ aromatic compound, a substituted or unsubstituted $C_5$-$C_{30}$ heterocyclic compound, or a combination thereof.

The core may be represented by Formula 1, and a non-conductive carbonaceous film containing oxygen is formed on at least one portion of the surface of the core.

wherein in Formula 1, a is 0.8≤a≤1.2, b is 0<b≤1, and c is 0≤c≤1,

M may be at least one element selected from manganese (Mn), nickel (Ni), cobalt (Co), copper (Cu), magnesium (Mg), sodium (Na), calcium (Ca), titanium (Ti), zinc (Zn), gallium (Ga), germanium (Ge), aluminum (Al), chromium (Cr), strontium (Sr), molybdenum (Mo), tungsten (W), vanadium (V), zirconium (Zr), ruthenium (Ru), rhodium (Rh), palladium (Pd), osmium (Os), iridium (Ir), silver (Ag), gold (Au), hafnium (Hf), tin (Sn), and platinum (Pt), and X1 is at least one element selected from oxygen (O), fluorine (F), sulfur (S), and phosphorus (P).

A relationship between a ratio ($I_A/I_B$) of a peak intensity at a binding energy of about 531 eV to about 533 eV with respect to a peak intensity at a binding energy of about 528 eV to about 530 eV of O1s spectra of X-ray photoelectron spectroscopy analysis of the surface of the core and an amount (D) of carbon in the non-conductive carbonaceous film with respect to 100 parts by weight of the core on the surface of the core may be represented by Inequation 1 below:

$$[(I_A/I_B)/D] \geq 10 \text{ parts by weight}^{-1}. \quad \text{Inequation 1}$$

An amount of carbon in the non-conductive carbonaceous film may be about 0.001 part by weight to about 0.3 part by weight, based on 100 parts by weight of the core.

A thickness of the non-conductive carbonaceous film may be in a range of about 0.1 nm to about 5.0 nm.

The core may be represented by Formula 2 below, and the non-conductive carbonaceous film containing oxygen may be formed on at least one portion of the surface of the core:

$$q\text{Li}_2\text{MnO}_3\cdot(1-q)\text{Li(M1)O}_2 \quad \text{Formula 2}$$

wherein in Formula 2,

0<q<1, and

M1 may be at least one element selected from Mn, Ni, Co, Cu, Mg, Na, Ca, Ti, Zn, Ga, Ge, Al, Cr, Sr, Mo, W, V, Ti, Zr, Ru, Rh, Pd, Os, Ir, Ag, Au, Hf, Sn, and Pt.

The non-conductive carbonaceous film may further include $\text{Li}_2\text{CO}_3$.

In a C1s spectrum of a X-ray photoelectron spectroscopy (XPS) analysis of the non-conductive carbonaceous film, a ratio of $I_D/I_C$ may be 0.3 or more, wherein $I_D$ denotes a peak intensity of $\text{Li}_2\text{CO}_3$ phase at a binding energy of 288 eV to 293 eV, and $I_C$ denotes a peak intensity of C—C bond phase at a binding energy of 282 eV to 285 eV.

The core may be represented by Formula 3 and the non-conductive carbonaceous film containing oxygen may be disposed on at least one portion of the surface of the core, $$\text{Na}_x(\text{Q})\text{O}_{2+e} \quad \text{Formula 3}$$

wherein in Formula 3, Q may be at least two transition metal elements selected from Groups 4 to 12 of the periodic table, and $0.5 \leq x \leq 1$, and $-0.3 \leq e \leq 51$.

An oxygen depletion layer may be further disposed between the core and the non-conductive carbonaceous film.

According to another aspect, provided is a secondary battery including:

a positive electrode;

an electrolyte; and a negative electrode, wherein the positive electrode includes the positive active material.

An operation voltage of the positive active material may be 4.4 V±0.1 V.

According to another aspect, provided is a method of preparing a positive active material, the method including:

mixing an oxide core including a metal oxide, a non-metal oxide, or a combination thereof capable of intercalation and deintercalation of lithium ions or sodium ions, a carbonaceous precursor having at least one hydroxy group or carboxyl group, and a solvent to chemically adsorb the carbonaceous precursor on at least one portion of the surface of the core; and heat treating the core on which the carbonaceous precursor is adsorbed to form a non-conductive carbonaceous film containing oxygen.

BRIEF DESCRIPTION OF THE DRAWINGS

These and/or other aspects will become apparent and more readily appreciated from the following description of the embodiments, taken in conjunction with the accompanying drawings in which:

FIG. 7B shows a O1s spectrum of XPS analysis on surfaces of the positive active materials prepared in Examples 7 to 9 and Comparative Example 5.

DETAILED DESCRIPTION

Figure 1:
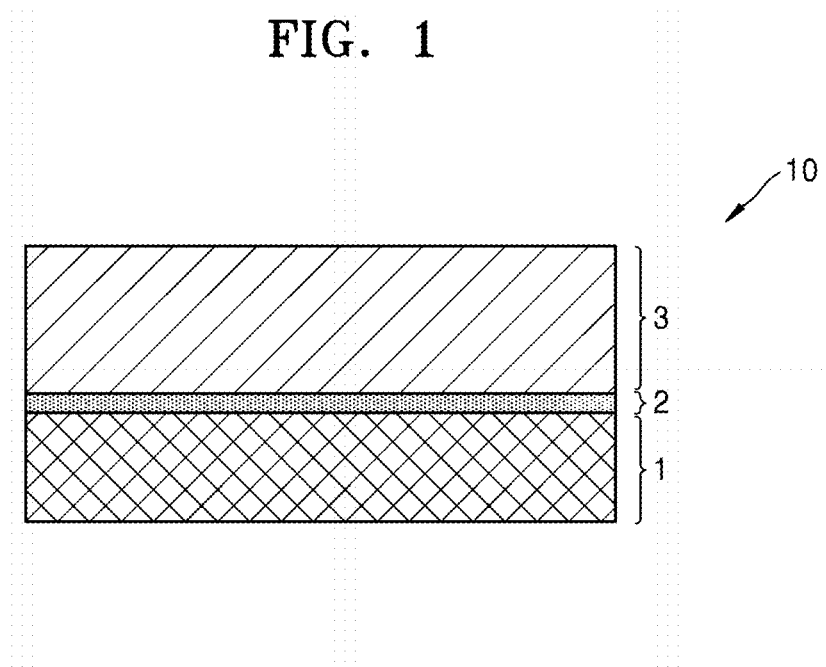
FIG. 1 is a schematic view of an embodiment of a positive active material 10 according to an embodiment.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

Hereinafter, a positive active material according to an embodiment, a secondary battery including the positive active material, and a method of manufacturing the positive active material will be described in greater detail.

According to an aspect, provided is a positive material comprising a core comprising a metal oxide, a non-metal oxide, or a combination thereof capable of intercalation and deintercalation of lithium ions or sodium ions and a non-conductive carbonaceous film including oxygen on at least one portion of a surface of the core.

A general metal oxide capable of intercalation and deintercalation of lithium ions, or a metal oxide, a non-metal oxide, or a combination thereof capable of intercalation and deintercalation of sodium ions may have high capacity and high average voltage to implement high energy density, and the metal oxide, the non-metal oxide, or the combination thereof are required to be charged and discharged at a high voltage.

However, when the metal oxide, the non-metal oxide, or the combination thereof are charged and discharged at a high voltage, a side reaction with the electrolyte may easily occur on the surface of the metal oxide, the non-metal oxide, or the combination thereof and thus, the structure thereof may easily collapse.

The positive active material according to an embodiment includes the non-conductive carbonaceous film containing oxygen on at least one portion of the surface of the core capable of intercalation and deintercalation of lithium ions, to maintain the structure of the core, for example, the core of the metal oxide, the non-metal oxide, or the combination thereof, even when the positive active material is charged and discharged at a high voltage. Also, in the positive active material, a side reaction with the electrolyte on the surface of the metal oxide, the non-metal oxide, or the combination thereof may be inhibited, and thus, the initial efficiency, capacity, and lifespan characteristics of the lithium battery or the sodium battery including the positive active material may be improved.

The non-conductive carbonaceous film may include a carbon compound having at least one functional group of —C(=O)$R_a$, —C(=O)O$R_a$, or —OC(=O)O$R_a$, wherein $R_a$ may be hydrogen, a $C_1$-$C_{10}$ alkyl group, or a $C_6$-$C_{20}$ aryl group.

The surface of the core of a metal oxide, a non-metal oxide, or a combination thereof capable of intercalation and deintercalation of lithium ions or sodium ions of the non-conductive carbonaceous film may be partially reduced, such that the surface of the core may include the carbon compound having at least one functional group of —C(=O)$R_a$, —C(=O)O$R_a$, or —OC(=O)O$R_a$ formed by a chemical bond such as an ionic bond or a covalent bond between oxygen atoms released from the surface of the core and carbonaceous precursors on the surface of the core. The carbon compound may include a substituted or unsubstituted $C_6$-$C_{30}$ aromatic compound, a substituted or unsubstituted $C_5$-$C_{30}$ heterocyclic compound, or a combination thereof.

For example, the carbon compound may be a substituted or unsubstituted benzene, a substituted or unsubstituted pentalene, a substituted or unsubstituted indene, a substituted or unsubstituted naphthalene, a substituted or unsubstituted azulene, a substituted or unsubstituted heptalene, a substituted or unsubstituted indacene, a substituted or unsubstituted acenaphthalene, a substituted or unsubstituted fluorene, a substituted or unsubstituted phenalene, a substituted or unsubstituted phenanthrene, a substituted or unsubstituted anthracene, a substituted or unsubstituted fluoranthene, a substituted or unsubstituted triphenylene, a substituted or unsubstituted pyrene, a substituted or unsubstituted chrysene, a substituted or unsubstituted naphthacene, a substituted or unsubstituted picene, a substituted or unsubstituted perylene, a substituted or unsubstituted pentaphene, a substituted or unsubstituted hexacene, a substituted or unsubstituted pyrrole, a substituted or unsubstituted pyrazole, a substituted or unsubstituted imidazole, a substituted or unsubstituted imidazolidine, a substituted or unsubstituted imidazopyridine, a substituted or unsubstituted imidazopyrimidine, a substituted or unsubstituted pyridine, a substituted or unsubstituted pyrazine, a substituted or unsubstituted pyrimidine, a substituted or unsubstituted pyridazine, a substituted or unsubstituted indole, a substituted or unsubstituted purine, a substituted or unsubstituted quinoline, a substituted or unsubstituted phthalazine, a substituted or unsubstituted naphthyridine, a substituted or unsubstituted quinazoline, a substituted or unsubstituted cinnoline, a substituted or unsubstituted indazole, a substituted or unsubstituted carbazole, a substituted or unsubstituted phenazine, a substituted or unsubstituted phenanthridine, a substituted or unsubstituted triazine, a substituted or unsubstituted phenanthroline, or a substituted or unsubstituted quinoxaline. For example, the carbon compound may be a substituted or unsubstituted benzene, a substituted or unsubstituted naphthalene, a substituted or unsubstituted phenalene, a substituted or unsubstituted phenanthrene, a substituted or unsubstituted anthracene, a substituted or unsubstituted triphenylene, a substituted or unsubstituted pyrene, a substituted or unsubstituted chrysene, a substituted or unsubstituted naphthacene, a substituted or unsubstituted picene, a substituted or unsubstituted perylene, a substituted or unsubstituted pentaphene, a substituted or unsubstituted hexacene, a substituted or unsubstituted pyridine, a substituted or unsubstituted pyrazine, a substituted or unsubstituted pyrimidine, a substituted or unsubstituted pyridazine, a substituted or unsubstituted quinoline, a substituted or unsubstituted phthalazine, a substituted or unsubstituted quinoxaline, a substituted or unsubstituted quinazoline, a substituted or unsubstituted cinnoline, a substituted or unsubstituted phenanthridine, a substituted or unsubstituted phenanthroline, or a substituted or unsubstituted phenazine.

The term "substituted" as used herein refers to substitution with a halogen atom, a $C_1$-$C_{20}$ alkyl group substituted with a halogen atom (for example: $CCF_3$, $CHCF_2$, $CH_2F$, or $CCl_3$), a hydroxy group, a nitro group, a cyano group, an amino group, an amidino group, a hydrazine, a hydrazone, a carboxyl group or a salt thereof, a sulfonic acid group or a salt thereof, a phosphoric acid or a salt thereof, or substitution with a $C_1$-$C_{20}$ alkyl group, a $C_2$-$C_{20}$ alkenyl group, a $C_2$-$C_{20}$ alkynyl group, a $C_1$-$C_{20}$ heteroalkyl group, a $C_6$-$C_{20}$ aryl group, a $C_6$-$C_{20}$ arylalkyl group, a $C_6$-$C_{20}$ heteroaryl group, or a $C_6$-$C_{20}$ heteroarylalkyl group. Such carbon compound may supplement conductivity of the non-conductive carbonaceous film.

A relationship between a ratio ($I_A/I_B$) of peak intensity at a binding energy of about 531 eV to about 533 eV with respect to a peak intensity at a binding energy of about 528 eV to about 530 eV of O1s spectra of x-ray photoelectron spectroscopy analysis of the surface of the core, and an amount (D) of carbon in the non-conductive carbonaceous film based on 100 parts by weight of the core on the surface of the core may be represented by Inequation 1 below:

$$[(I_A/I_B)/D] \geq 10 \text{ parts by weight}^{-1} \qquad \text{Inequation 1}$$

wherein in Inequation 1, a peak intensity ($I_B$) at a binding energy of about 528 eV to about 530 eV indicates the presence of a nickel oxide, a cobalt oxide, or a manganese oxide, and a peak intensity ($I_A$) at a binding energy of about 531 eV to about 533 eV indicates the presence of a carbon compound having a —C(=O)OH group and a —C=O group. An amount of carbon (D) in the non-conductive carbonaceous film based on 100 parts by weight of the core on the surface of the core may be measured by using an element analyzer (EA) described below.

The positive active material may form the non-conductive carbonaceous film, wherein a small amount of non-conductive carbon is included in the surface of the core. Such non-conductive carbonaceous film may inhibit a side reaction between the surface of the core and the electrolyte to improve initial efficiency, capacity, and lifespan characteristics of the lithium battery including the non-conductive carbonaceous film.

An amount of carbon in the non-conductive carbonaceous film may be about 0.1 parts or less by weight based on 100 parts by weight of the core. For example, the amount of carbon in the non-conductive carbonaceous film may be about 0.001 part by weight to about 0.1 parts by weight based on 100 parts by weight of the core. For example, the amount of carbon in the non-conductive carbonaceous film may be about 0.001 part by weight to about 0.05 part by weight based on 100 parts by weight of the core. When the amount of carbon in the non-conductive carbonaceous film is within the range described above, a thin and uniform non-conductive carbonaceous film may be formed on the surface of the core with an amount of carbon to about 1/10 level of the amount of carbon in a general coating material.

Thus, initial efficiency, capacity and lifespan characteristics of the lithium battery including the non-conductive carbonaceous film may be improved.

A thickness of the non-conductive carbonaceous film may be about 0.1 nm to about 5.0 nm. For example, the thickness of the non-conductive carbonaceous film may be about 0.1 nm to about 4.0 nm. A non-conductive carbonaceous film having a thickness in the range described above may minimize resistance differential between an interface of the core capable of intercalation and deintercalation of lithium ions and an interface of the non-conductive carbonaceous film. Also, a side reaction with the electrolyte on the metal oxide surface may be inhibited such that initial efficiency, capacity, and lifespan characteristics of the lithium battery including the non-conductive carbonaceous film may be improved.

The core may be represented by Formula 2 below, and the non-conductive carbonaceous film containing oxygen may be formed on at least a portion of the surface of the core:

$$q\text{Li}_2\text{MnO}_3 \cdot (1-q)\text{Li}(M1)\text{O}_2 \qquad \text{Formula 2}$$

wherein in Formula 2,
0<q<1, and
M1 may be at least one element selected from Mn, Ni, Co, Cu, Mg, Na, Ca, Ti, Zn, Ga, Ge, Al, Cr, Sr, Mo, W, V, Ti, Zr, Ru, Rh, Pd, Os, Ir, Ag, Au, Hf, Sn, and Pt.

The non-conductive carbonaceous film may further include $Li_2CO_3$.

The core has a layered structure, and during charging and discharging, manganese ions migrate into a space between lithium layers and thus, the core is converted to have a spinel-like configuration in its crystal lattice, thereby being unstable. However, on at least one portion of the surface of the core, Li released from $Li_2MnO_3$ phase included in the layered structure reacts with oxygen to form $Li_2CO_3$ in non-conductive carbonaceous film. Accordingly, during charging and discharging, conversion into a spinel structure, such as a stable $Li_2MnO_4$ phase, is highly likely. Thus, at the surface of the core, a side-reaction with an electrolyte may be suppressed, and a lithium battery including the cathode active material may have improved initial efficiency, capacity, and lifespan characteristics.

In a C1s spectrum of X-ray photoelectron spectroscopy (XPS) of the non-conductive carbonaceous film, a ratio of $I_D/I_C$ may be 0.3 or more, wherein $I_D$ denotes a peak intensity of $Li_2CO_3$ phase at a binding energy of 288 eV to 293 eV, and $I_C$ denotes a peak intensity of C—C bond phase at a binding energy of 282 eV to 285 eV. For example, the ratio of $I_D/I_C$ may be from about 0.3 to about 1.0.

The core may include a non-conductive carbonaceous film that is represented by Formula 3 and contains oxygen on at least one portion of surface of the core.

$$\text{Na}_x(Q)\text{O}_{2+e} \qquad \text{Formula 3}$$

wherein in Formula 3,
Q may be at least two transition metal elements selected from Groups 4 to 12 of the periodic table, and
0.5≤x≤1, and −0.3≤e≤1.
For example, the core may be represented by Formula 4 below.

$$\text{Na}_x\text{Qa}_z\text{Qb}_v\text{O}_{2+d} \qquad \text{Formula 4}$$

wherein in Formula 4,
Qa may be at least one element selected from Fe, Ru, Os, Cr, Mo, and W,
Qb may be at least one element selected from Groups 4, 5, 7, 9, and 10 of the periodic table, and
0.5≤x<1, 0.3≤z≤0.5, 0.5≤v≤0.7, z+v=1, and −0.3≤d<1.

For example, the core may be represented by Formula 4 below.

$$Na_xQa_zQb_vO_{2+d}$$ Formula 4 wherein in Formula 4,
Qa may be Fe or Cr,
Qb may be at least one element selected from Mn, Co, Ni, V, and Ti, and
$0.5 \leq x < 1$, $0.3 \leq z \leq 0.5$, $0.5 \leq v \leq 0.7$, $z+v=1$, and $-0.3 \leq d < 1$.

For example, the core may be represented by Formula 6 below.

$$Na_xFe_zQb_vO_2$$ Formula 6 wherein in Formula 6,
Qb may be Mn or Ni, and
$0.5 \leq x < 1$, $0.3 \leq z \leq 0.5$, $z+v=1$, and $0.5 \leq v \leq 0.7$.

The core mainly includes a layered rock salt crystal structure and may have improved structural stability. Therefore, a sodium battery including the core may have improved initial discharge capacity, efficiency, and lifespan characteristics.

An amount of carbon included in the non-conductive carbonaceous film containing oxygen on at least one portion of surface of the core may be about 0.3 part or less by weight based on 100 parts by weights of the core. For example, the amount of carbon included in the non-conductive carbonaceous film containing oxygen on at least one portion of surface of the core may be about 0.001 part to about 0.3 part by weight based on 100 parts by weights of the core. For example, the amount of carbon included in the non-conductive carbonaceous film containing oxygen on at least one portion of surface of the core may be 0.001 part to 0.2 parts by weight based on 100 parts by weights of the core. For example, the amount of carbon included in the non-conductive carbonaceous film containing oxygen on at least one portion of surface of the core may be 0.001 part to 0.15 parts by weight based on 100 parts by weights of the core. For example, the amount of carbon included in the non-conductive carbonaceous film containing oxygen on at least one portion of surface of the core may be 0.001 part to 0.1 parts by weight based on 100 parts by weights of the core. For example, the amount of carbon included in the non-conductive carbonaceous film containing oxygen on at least one portion of surface of the core may be 0.001 part to 0.05 part by weight based on 100 parts by weights of the core.

When the amount of carbon in the non-conductive carbonaceous film is within the range described above, a thin and uniform non-conductive carbonaceous film may be formed on the surface of the core with an extremely small amount of carbon in comparison with the amount of carbon in a general coating material. Thus, initial efficiency, capacity and lifespan characteristics of the sodium battery including the non-conductive carbonaceous film may be improved.

The thickness of the non-conductive carbonaceous film may be from about 0.1 nm to about 5.0 nm. For example, the thickness of the non-conductive carbonaceous film may be from about 0.1 nm to about 4.0 nm. For example, the thickness of the non-conductive carbonaceous film may be from about 0.1 nm to about 3.0 nm. For example, the thickness of the non-conductive carbonaceous film may be from about 0.1 nm to about 2.5 nm.

When the thickness of the non-conductive carbonaceous film is within the range described above, the resistance difference between the core interface and the non-conductive carbonaceous film interface may be minimized, and a side reaction with the electrolyte on the core surface may be inhibited. Therefore, initial efficiency, capacity, and lifespan characteristics of the sodium battery including the non-conductive carbonaceous film may be improved.

An oxygen depletion layer may be further included between the core and the non-conductive carbonaceous film. The oxygen depletion layer may be a layer formed by reduction of at least one portion of the surface of the core.

FIG. 1 is a schematic view of a positive active material 10 according to an embodiment. Referring to FIG. 1, the positive active material 10 includes a core 1 capable of intercalation and deintercalation of lithium ions or sodium ions, an oxygen depletion layer 2 and a non-conductive carbonaceous film 3 containing oxygen formed on a surface of the core. The oxygen depletion layer 2 may be formed by a reduction reaction in which oxygen atoms are released from the surface of the core 1 capable of intercalation and deintercalation of lithium ions or sodium ions.

According to another aspect, provided is a secondary battery including a positive electrode; an electrolyte; and a negative electrode, wherein the positive electrode may include the positive active material described above. The secondary battery may be manufactured as follows.

First, the positive electrode may be manufactured as follows.

A core comprising a metal oxide, a non-metal oxide, or a combination thereof capable of intercalation and deintercalation of lithium ions or sodium ions and a positive active material including a non-conductive carbonaceous film containing oxygen in at least one portion of the surface of the core may be mixed with a conductive material, a binder, and a solvent to prepare a positive active material composition. The positive active material composition may be directly coated and then dried on an aluminum current collector to manufacture a positive electrode plate in which a positive active material layer is formed. Alternatively, the positive active material composition may be casted on a separate support and then a film peeled off from the support may be laminated on the aluminum current collector to manufacture a positive electrode plate in which the positive active material layer is formed.

The core of a metal oxide, a non-metal oxide, or a combination thereof capable of intercalation and deintercalation of lithium ions or sodium ions and a composition, amount, and thickness of the non-conductive carbonaceous film are as described above and thus, descriptions thereof are omitted.

An operation voltage of the positive active material may be about 4.4V±0.1V. For example, the positive active material may have an operation voltage of about 4.3 V to about 4.5 V, and may be a high voltage positive active material.

The positive electrode may further include a conductive material. The conductive material may be a carbon material having a high specific surface area such as carbon black, graphite fine particle natural graphite, artificial graphite, acetylene black, ketjen black, carbon fiber; carbon nanotubes; a metal powder such as copper, nickel, aluminum, or silver, a metal fiber, or a metal tube; a conductive polymer such as a polyphenylene derivative may be used. In addition, an electroconductive fiber such as a gas-phase-grown carbon fiber, a fiber prepared by carbonizing pitch (a byproduct of petroleum, coal, coal tar, etc.) at a high temperature, and a carbon fiber prepared from polyacrylonitrile may be used as the conductive material. A carbon fiber and a carbon material with a high specific surface area may be used simultaneously to improve electroconductivity. In addition, in a sodium battery, a metal conductive material, which is neither oxidized nor dissolved in a charge/discharge range of a positive electrode and which has a lower electric resistance than that of a positive active material, may be used. For example, a metal conductive material may be a corrosion resistant metal such as titanium and gold, a carbide such as SiC and WC, or a nitride such as $Si_3N_4$, and BN. However, the conductive material is not limited thereto and may be any conductive material used in the art.

The binder may be a vinylidene fluoride/hexafluoropropylene copolymer, polyvinylidenefluoride, polyacrylonitrile, a fluorine compound polymer, polytetrafluoroethylene (PTFE), a mixture of the polymers described above, or a styrene butadiene rubber-based polymer, or carboxylic acid vinyl ester. The fluorine compound polymer may be, for example, a fluorinated $C_1$-$C_{18}$ alkyl (meth)acrylate; a perfluoroalkyl (meth)acrylate (such as perfluorododecyl (meth)acrylate, perfluoro-n-octyl (meth)acrylate, and perfluoro-n-butyl (meth)acrylate); a perfluoroalkyl-substituted alkyl (meth)acrylate (such as perfluorohexylethyl (meth)acrylate and perfluorooctylethyl (meth)acrylate); a perfluoroalkyloxyalkyl (meth)acrylate (such as perfluorododecyloxyethyl (meth)acrylate and perfluorodecyloxyethyl (meth)acrylate); a fluorinated C1-C18 alkyl crotonate; a fluorinated C1-C18 alkyl maleate; a fluorinated C1-C18 alkyl fumarate; a fluorinated C1-C18 alkyl itaconate; a fluorinated C2-C10 olefin substituted with a fluorinated alkyl group having 1 to 17 fluorine atoms such as perfluorohexylethylene; and a C2-C10 olefin having 1 to 20 fluorine atoms in which the fluorine atom binds to the double-bonded carbon atom such as tetrafluoroethylene, trifluoroethylene, vinylidene fluoride and hexafluoropropylene.

Examples of the binder also include polysaccharides such as starch, methyl cellulose, carboxymethyl cellulose, hydroxymethyl cellulose, hydroxyethyl cellulose, hydroxypropyl cellulose, carboxymethyl hydroxyethyl cellulose, nitrocellulose, and derivatives thereof; phenol resins; melamine resins; polyurethane resins; urea resins; polyamide resins; polyimide resins; polyamide-imide resins; petroleum pitches and coal-tar pitches. A plurality of binders may be used. In addition, the binder may act as a viscosity agent in an electrode mixture.

The solvent may be N-methylpyrrolidone (NMP), acetone, or water, but the binder and the solvent are not limited thereto and may be anything used in the art.

Examples of the current collector include a metal such as nickel, aluminum, titanium, copper, silver, platinum, an aluminum alloy, or stainless steel, a material formed by plasma spraying or arc spraying of a carbon material, activated carbon fiber, nickel, aluminum, zinc, copper, tin, lead, or an alloy thereof, or a conductive film formed by dispersing a conductive material on a resin such as rubber or styrene-ethylene-butylene-styrene copolymer (SEBS). For example, aluminum, nickel, or stainless steel may be used. In particular, aluminum may be used because aluminum may be easily processed to a thin film and is cheap. The shape of the current collector is not particularly limited and may be a thin film, a plate, a mesh, a net, a punching shape, or an embossing shape or a combination thereof (for example, a mesh type plate). For example, a jagged shape may be formed on the surface of the current collector by etching.

Amounts of the positive active material, the conductive material, the binder, and the solvent are amounts commonly used for a lithium battery or a sodium battery. One of the conductive material, binder, or solvent may be omitted according to the usage and structure of a lithium battery or a sodium battery.

The positive electrode may additionally include a general positive active material, in addition to the positive active material described above. The general positive active material may be any positive active material used as the positive electrode in the art and may be any positive active material capable of intercalation and deintercalation of lithium ions or sodium ions.

The positive active material capable of intercalation and deintercalation of lithium ions is not particularly limited. For example, the positive active material capable of intercalation and deintercalation of lithium ions may be a compound represented by one of chemical formulas such as $Li_aA_{1-b}B'_bD'_2$ ($0.90 \le a \le 1.8$, and $0 \le b \le 0.5$); $Li_aE_{1-b}B'_bO_{2-c}D'_c$ ($0.90 \le a \le 1.8$, $0 \le b \le 0.5$, $0 \le c \le 0.05$); $LiE_{2-b}B'_bO_{4-c}D'_c$ ($0 \le b \le 0.5$, $0 \le c \le 0.05$); $Li_aNi_{1-b-c}Co_bB'_cD'_\alpha$ ($0.90 \le a \le 1.8$, $0 \le b \le 0.5$, $0 \le c \le 0.05$, $0 < \alpha \le 2$); $Li_aNi_{1-b-c}Co_bB'_cO_{2-\alpha}F'_\alpha$ ($0.90 \le a \le 1.8$, $0 \le b \le 0.5$, $0 \le c \le 0.05$, $0 < \alpha < 2$); $Li_aNi_{1-b-c}Co_bB'_cO_{2-\alpha}F'_2$ ($0.90 \le a \le 1.8$, $0 \le b \le 0.5$, $0 \le c \le 0.05$, $0 < \alpha < 2$); $Li_aNi_{1-b-c}Mn_bB'_cD'_\alpha$ ($0.90 \le a \le 1.8$, $0 \le b \le 0.5$, $0 \le c \le 0.05$, $0 < \alpha \le 2$); $Li_aNi_{1-b-c}Mn_bB'_cO_{2-\alpha}F'_\alpha$ ($0.90 \le a \le 1.8$, $0 \le b \le 0.5$, $0 \le c \le 0.05$, $0 < \alpha < 2$); $Li_aNi_{1-b-c}Mn_bB'_cO_{2-\alpha}F'_2$ ($0.90 \le a \le 1.8$, $0 \le b \le 0.5$, $0 \le c \le 0.05$, $0 < \alpha < 2$); $Li_aNi_bE_cG_dO_2$ ($0.90 \le a \le 1.8$, $0 \le b \le 0.9$, $0 \le c \le 0.5$, $0.001 \le d \le 0.1$); $Li_aNi_bCo_cMn_dG_eO_2$ ($0.90 \le a \le 1.8$, $0 \le b \le 0.9$, $0 \le c \le 0.5$, $0 \le d \le 0.5$, $0.001 \le e \le 0.1$); $Li_aNiG_bO_2$ ($0.90 \le a \le 1.8$, $0.001 \le b \le 0.1$); $Li_aCoG_bO_2$ ($0.90 \le a \le 1.8$, $0.001 \le b \le 0.1$); $Li_aMnG_bO_2$ ($0.90 \le a \le 1.8$, $0.001 \le b \le 0.1$); $Li_aMn_2G_bO_4$ ($0.90 \le a \le 1.8$, $0.001 \le b \le 0.1$); $LiQO_2$; $LiQS_2$; $LiV_2O_5$; $LiI'O_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); and $LiFePO_4$.

In the foregoing formulas, A is at least one selected from Ni, Co, and Mn; B' is at least one selected from Al, Ni, Co, Mn, Cr, Fe, Mg, Sr, V, and a rare earth element; D' is at least one selected from O, F, S, and P; E is at least one selected from Co and Mn; F' is at least one selected from F, S, and P; G is at least one selected from Al, Cr, Mn, Fe, Mg, La, Ce, Sr, and V; Q is at least one selected from Ti, Mo, and Mn; I' is Cr, V, Fe, Sc, and Y; and J is at least one selected from V, Cr, Mn, Co, Ni, and Cu.

The positive active material may be at least one composite oxide of a metal selected from cobalt, manganese, nickel, and a combination thereof and lithium.

The positive active material capable of intercalation and deintercalation of sodium ions is not particularly limited. Examples of the positive active material capable of intercalation and deintercalation of sodium ions include an oxide represented by $NaM^1_aO_2$ such as $NaFeO_2$, $NaMnO_2$, $NaNiO_2$, and $NaCoO_2$; an oxide represented by $Na_{0.44}Mn_{1-a}M^1_aO_2$; an oxide represented by $Na_{0.7}Mn_{1-a}M^1_aO_{2.05}$ ($M^1$ is at least one transition metal, and $0 \le a < 1$); an oxide represented by $Na_bM^2_cSi_{12}O_{30}$ such as $Na_6Fe_2Si_{12}O_{30}$ and $Na_2Fe_5Si_{12}O_{30}$ ($M^2$ is at least one transition metal, $2 \le b \le 6$, and $2 \le c \le 5$); an oxide represented by $Na_dM^3_eSi_6O_{18}$ such as $Na_2Fe_2Si_6O_{18}$ and $Na_2MnFeSi_6O_{18}$ ($M^3$ is at least one transition metal, $3 \le d \le 6$, and $1 \le e \le 2$); an oxide represented by $Na_fM^4_gSi_2O_6$ such as $Na_2FeSiO_6$ ($M^4$ is at least one element selected from transition metals, Mg, and Al, $1 \le f \le 2$, and $1 \le g \le 2$); a phosphate such as $NaFePO_4$ and $Na_3Fe_2(PO_4)_3$; a borate such as $NaFeBO_4$ and $Na_3Fe_2(BO_4)_3$; a fluoride represented by $Na_hM^5F_6$ such as $Na_3FeF_6$ and $Na_2MnF_6$ ($M^5$ is at least one transition metal, and $2 \le h \le 3$).

The negative electrode may be manufactured in the same manner as the positive electrode, except that a negative active material is used instead of positive active material.

For example, the negative electrode may be manufactured as follows.

As in the case of manufacturing the positive electrode, the negative active material, the conductive material, the binder, and the solvent may be mixed to prepare a negative active material composition, which may be directly applied to a copper current collector to manufacture a negative electrode plate. Alternatively, the negative active material composition may be casted on a separate support and a negative active material film peeled off from the support may be laminated on the copper current collector to manufacture a negative electrode plate. However, in the case of a sodium battery, the negative electrode plate may be manufactured by using the method described above only when the negative electrode active material is powder.

A lithium metal, a metal material alloyable with lithium, a transition metal oxide, a material capable of doping and undoping lithium, or a material capable of a reversible intercalaction and deintercalation of lithium ions may be used as the negative active material of a lithium battery.

Examples of the transition metal oxide may be vanadium oxide or lithium vanadium oxide, and examples of the material capable of doping and undoping lithium include Si, $SiO_x (0<x<2)$, a Si—Y alloy (wherein, Y is an alkali metal, an alkaline earth metal, a Group 13 element to Group 16 element, a transition metal, a rare earth metal element or a combination element thereof, but not Si), Sn, $SnO_2$, and Sn—Y (wherein, Y is an alkali metal, an alkaline earth metal, a Group 13 element to Group 16 element, a transition metal, a rare earth metal element, or a combination thereof, but not Sn), and at least one of these may be mixed with $SiO_2$. The element Y may be magnesium (Mg), calcium (Ca), strontium (Sr), barium (Ba), radium ($R_a$), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), rubidium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), germanium (Ge), phosphorus (P), arsenic (As), antimony (Sb), bismuth (Bi), sulfur (S), selenium (Se), tellurium (Te), pollonium (Po), or a combination thereof.

The material that may reversibly intercalate and deintercalate lithium ions may be any carbonaceous material, which may be a carbonaceous negative active material generally used in a lithium ion secondary battery, and representative examples thereof include crystalline carbon, amorphous carbon, or a combination thereof. Examples of the crystalline carbon include graphite, such as amorphous, plate, flake, spherical, or fibrous natural graphite or artificial graphite. Examples of the amorphous carbon include soft carbon (low temperature calcined carbon) or hard carbon, mesophase pitch carbide, and calcined coke.

However, the negative active material is not limited thereto and may be any negative active material used in the art that may intercalate and deintercalate lithium.

Examples of the negative active material of a sodium battery may include a sodium metal, a sodium metal-based alloy, a sodium intercalating compound or a carbon material, but are not limited thereto. Any material that is used as a negative active material in the art and includes sodium or is capable of intercalation and deintercalation of sodium ions may be used as the negative active material. Since the negative electrode determines the capacity of a sodium battery, the negative electrode may be, for example, a sodium metal. The sodium metal-based alloy may be, for example, an alloy of aluminum, tin, indium, calcium, titanium, and vanadium with sodium.

For example, the negative electrode may be a sodium metal generally having a thickness of from about 3 μm to about 500 μm, and may be configured in various forms, such as a film, a sheet, a foil, a net, a porous body, a foam body, and a non-woven fabric body.

When a negative active material besides a sodium metal or a sodium alloy is used, a carbon material having a graphene structure may be used. A mixed negative electrode of graphite and graphitized carbon, a mixed negative electrode of a carbon material and a metal or an alloy, or a composite negative electrode may be used. As a carbon material, a carbonaceous material capable of intercalating and deintercalating sodium ions such as natural graphite, artificial graphite, mesophase carbon, expanded graphite, carbon fiber, gas phase grown carbon fiber, pitch-based material, needle coke, petroleum coke, polyacrylonitrile carbon fiber, and carbon black, or an amorphous carbon material synthesized by pyrolysis of a five-membered ring or six-membered ring cyclic hydrocarbon or a cyclic oxygen-containing organic compound may be used.

In the negative active material composition, the conductive material, the binder, and the solvent may be the same as those of the positive electrode. Alternatively, a plasticizer may be added to the positive active material composition and the negative active material composition to form pores in the inner portion of the electrode plate.

A negative electrode current collector is not limited to a particular material, shape, or manufacturing method, but any suitable negative electrode current collector may be used. For example, a copper foil having a thickness from about 10 to about 100 μm, a perforated copper foil having a thickness from about 10 to about 100 μm and a hole diameter from about 0.1 to about 10 mm, an expanded metal, or a foamed metal plate may be used. In addition to copper, stainless steel, titanium, or nickel may be used as a negative electrode current collector material.

Amounts of the negative active material, the conductive material, the binder, and the solvent may be equal to those commonly used for a lithium battery or a sodium battery. At least one of the conductive material, the binder, and the solvent of the lithium battery or the sodium battery may be omitted depending on the use and composition thereof.

Thereafter, a separator to be formed between the positive electrode and the negative electrode is prepared. The separator may be any separator commonly used in a lithium battery or a sodium battery. More specifically, the separator that has low resistance to migration of ions of an electrolyte and an excellent electrolytic solution-retaining capability may be used. For example, the separator may be selected from glass fiber, polyester, teflon, polyethylene, polypropylene, polytetrafluoroethylene (PTFE), or a combination thereof, which may be woven or non-woven. For example, a windable separator such as polyethylene or polypropylene may be used in the lithium ion battery, and a separator having excellent organic electrolyte solution retaining capability may be used in a lithium ion polymer battery. For example, the separator may be manufactured according to the method described below.

A polymer resin, a filler, and a solvent are mixed to prepare a separator composition. The separator composition may be directly applied to and then dried on an electrode to form a separator. Alternatively, the separator composition may be casted and then dried on a support and a separator film peeled off from the support may be laminated on the electrode to form a separator.

A polymer resin used in manufacturing the separator is not particularly limited and may be any material used in a binder of an electrode plate. For example, a vinylidenefluoride/hexafluoropropylene copolymer, polyvinylidenefluoride (PVDF), polyacrylonitrile, polymethylmethacrylate, or a mixture thereof may be used. Any solvents that are capable of dissolving the polymer resins, forming pores in the polymer resins during drying, and commonly used in the art may be used as the solvent.

In addition, the separator may be separately manufactured by using a method known in the art and laminated on the top of the negative active material layer. For example, the separator may be manufactured by using a dry method wherein polypropylene or polyethylene is melted and extruded to form a film, the resulting film is annealed at a low temperature and a crystalline domain is grown in the film, and then the resulting film is elongated to extend an amorphous domain and thus form a microporous membrane. For example, the separator may be manufactured by using a wet method wherein a low molecular weight material such as a hydrocarbon solvent is mixed with polypropylene or polyethylene, a film is formed, and then a microporous membrane is formed by removing the solvent or the low molecular weight material by using another volatile solvent from the film that starts to form island-type phases assembled with the noncystalline solvent or the low molecular weight material.

In addition, the separator may further include additives such as nonconductive particles, other fillers, and fiber compounds to control the strength, hardness, and thermal contraction. For example, the separator may further include inorganic particles. The inorganic particles may be further added to improve the oxidation resistance of the separator and inhibit deterioration of battery characteristics. The inorganic particles may comprise alumina ($Al_2O_3$), silica ($SiO_2$), or titania ($TiO_2$). The average diameter of the inorganic particles may be from about 10 nm to about 5 μm. When the average diameter is less than 10 nm, the crystallinity of the inorganic particles may be decreased and thus the effect of adding the particles may be negligible. When the average diameter is greater than 5 μm, the inorganic particles may be difficult to disperse.

The separator may have a multilayered structure including at least one polymer layer to increase the tear strength or mechanical strength. For example, a polyethylene/polypropylene laminate structure, a polyethylene/polypropylene/polyethylene laminate structure, or a non-woven fabric/polyolefine laminate structure may be included.

Then, an electrolyte is prepared.

In a lithium battery, for example, the electrolyte may be an organic electrolyte. Also, in a lithium battery, the electrolyte may be a solid. For example, the electrolyte may be boron oxide or lithium oxynitride, but the electrolyte is not limited thereto and may be any electrolyte used in the art that may be used as a solid electrolyte. The solid electrolyte may be formed on the negative electrode by sputtering or the like.

For example, an organic electrolyte solution may be prepared. The organic electrolyte solution may be prepared by dissolving a lithium salt in an organic solvent.

The organic solvent may be any organic solvent that may be used in the art. The organic solvent may be a nonprotonic solvent. For example, propylene carbonate, ethylene carbonate, fluoroethylene carbonate, butylenes carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, benzonitrile, acetonitrile, tetrahydrofuran, 2-methyl tetrahydrofuran, γ-butyrolactone, dioxolane, 4-methyl dioxolane, N,N-dimethyl formamide, dimethyl acetamide, dimethyl sulfoxide, 1,3-dioxane, 1,2-dimethoxy ethane, sulfolane, dichloroethane, chlorobenzene, nitrobenzene, diethylene glycol, dimethyl ether, or a mixture thereof may be used.

The lithium salt may be any lithium salt used in the art. For example, the lithium salt may be $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are natural numbers), LiCl, LiI, or a mixture thereof.

In a sodium battery, for example, the electrolyte may be an organic electrolyte prepared by dissolving sodium in an organic solvent.

The sodium salt used as the electrolyte may be, for example, $NaClO_4$, $NaPF_6$, $NaBF_4$, $NaCF_3SO_3$, $NaN(CF_3SO_2)_2$, $NaN(C_2F_5SO_2)_2$, or $NaC(CF_3SO_2)_3$, but is not limited thereto. The sodium salt may be any sodium salt that may be used in the art. In addition, among the salts used as a lithium salt for a lithium battery, salts of which lithium is substituted by sodium may be used.

The concentration of the electrolyte in the organic electrolyte may be appropriately determined by considering the solubility of the electrolyte in the organic electrolyte. For example, the concentration of the electrolyte may be from about 0.1 to about 5 M. For example, the concentration of the electrolyte may be from about 0.3 to about 3 M. For example, the concentration of the electrolyte may be from about 0.8 to about 1.5 M. When the concentration of the electrolyte is 0.1 M or higher, the ion conductivity of the organic electrolyte may be increased to decrease the internal resistance of the sodium battery. When the concentration of the electrolyte is 5 M or lower, the viscosity of the organic electrolyte may be decreased to decrease the internal resistance of the sodium battery.

The organic solvent may be a polar organic solvent having a water content of 200 ppm. For example, a nonprotonic organic solvent the same as the organic solvent used for the lithium battery may be used. However, the organic solvent is not limited thereto, and may be any organic solvent that may be used in the art.

Figure 5:
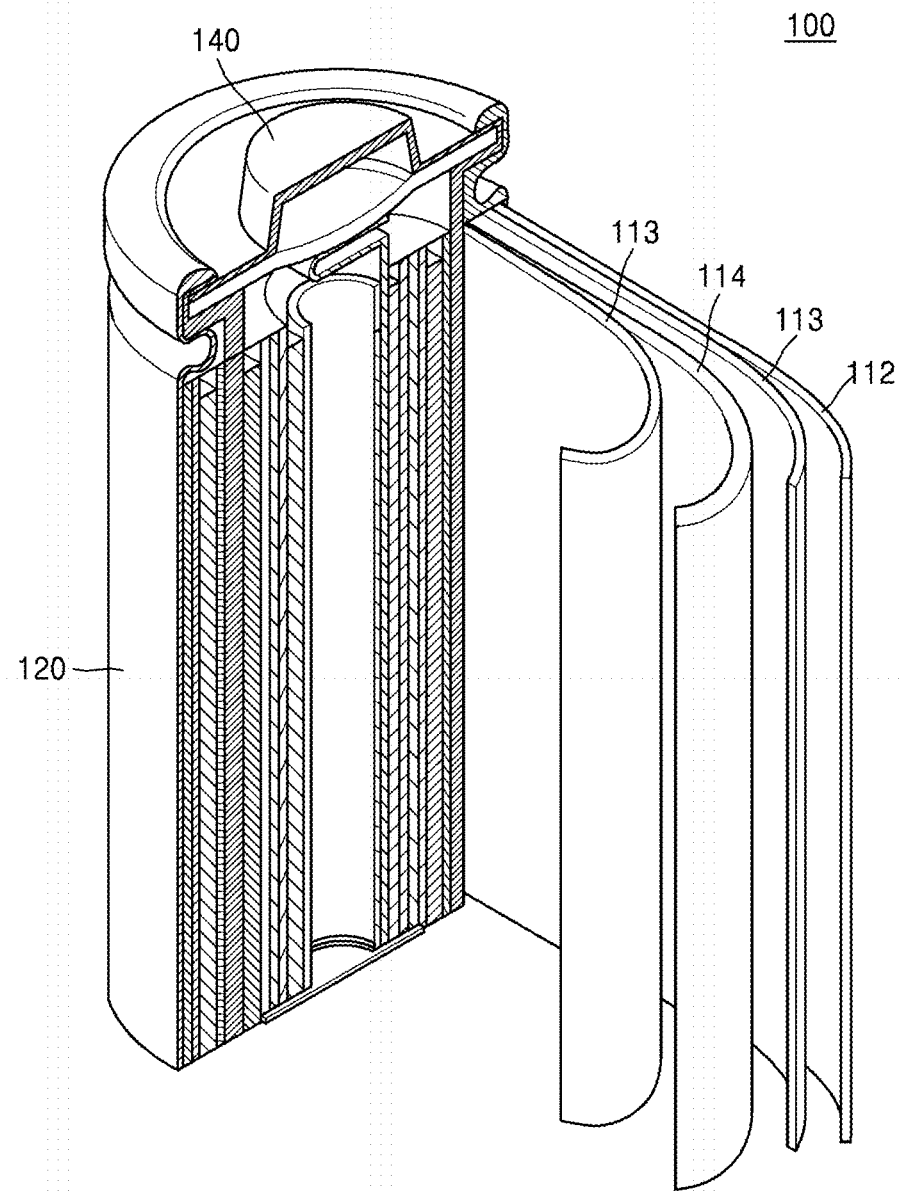
FIG. 5 is an exploded perspective view of an embodiment of a secondary battery.
Figure 6:
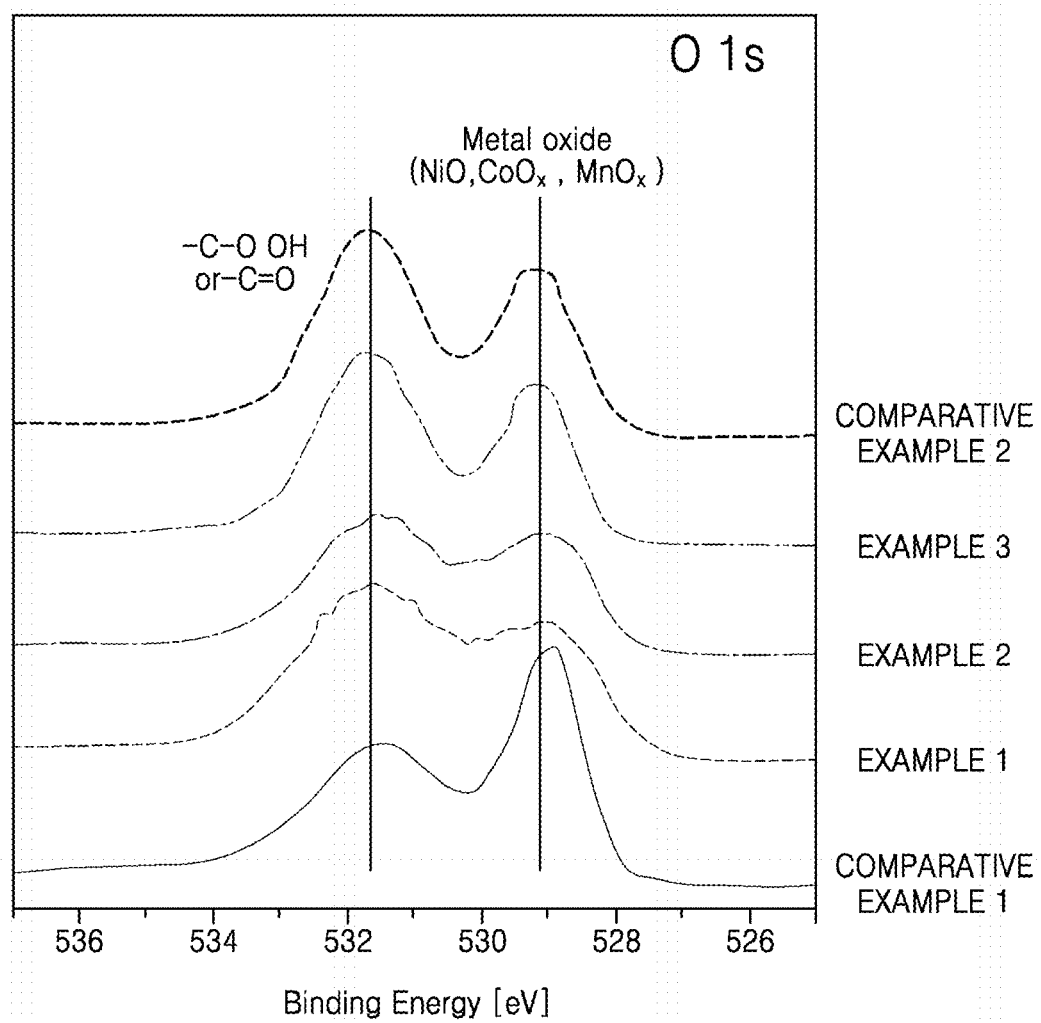
FIG. 6 shows an O1s spectra of X-ray photoelectron spectroscopy analysis of surfaces of the positive active materials manufactured in Examples 1 to 3 and Comparative Examples 1 and 2.

FIG. 5 is an exploded perspective view of a secondary battery 100 according to an embodiment. The secondary battery may be a lithium battery or a sodium battery.

As shown in FIG. 5, the secondary battery 100 includes a positive electrode 114, a separator 113, and a negative electrode 112 of a lithium battery or a sodium battery. The positive electrode 114, the separator 113, and the negative electrode 112 may be wound or folded and then encaptured in a battery case 120. Thereafter, an organic electrolyte solution is injected into the battery case 120 and the battery case 120 is sealed by using a sealing member 140 to complete the secondary battery 100. The battery case 120 may be of cylindrical, rectangular, or a thin-film type. For example, the lithium battery or the sodium battery may be of a large thin film type battery. The lithium battery or the sodium battery may be a lithium ion battery or a sodium ion battery.

The separator may be formed between the positive electrode and the negative electrode to complete the battery structure. After layering the battery structure into a bi-cell structure, the battery structure may be impregnated into an organic electrolyte solution and then a product obtained therefrom may be encaptured and then sealed in a pouch to complete a lithium ion polymer battery or a sodium ion polymer battery.

Also, a plurality of the battery structures may be laminated to form a battery pack, and the battery pack may be used in all devices that require high capacity and high output. For example, the battery pack may be used in laptop computers, smart phones, and electric vehicles.

Also, the lithium battery or the sodium battery has excellent storage stability, lifespan characteristics, and high rate characteristics at high temperature, and thus, the lithium battery may be used in electric vehicles (EV). For example, the lithium battery may be used in hybrid vehicles such as plug-in hybrid electric vehicles (PHEV).

According to another aspect, provided is a method of manufacturing a positive active material including mixing a core of a metal oxide, a non-metal oxide, or a combination thereof capable of intercalation and deintercalation of lithium ions or sodium ions, a carbonaceous precursor having at least one hydroxy group or carboxyl group, and a solvent to chemically adsorb the carbonaceous precursor on at least one portion of the surface of the core; and heat treating the core on which the carbonaceous precursor is adsorbed to form a non-conductive carbonaceous film containing oxygen.

First, the core capable of intercalation and deintercalation of lithium ions or sodium ions is prepared. The core of metal oxide, a non-metal oxide, or a combination thereof capable of intercalation and deintercalation of lithium ions or sodium ions is as described above and thus, description thereof will be omitted.

For example, in a lithium battery, the core may be manufactured according to the method described below.

In other words, a metal salt aqueous solution and a basic solution are coprecipitated to prepare a coprecipitation compound.

The metal salt aqueous solution may include at least one metal selected from Mn, Ni, Co, and a combination thereof, and at least one metal selected from Mn, Ni, Co, and a combination thereof along with selectively, at least one metal selected from Mo, W, V, Ti, Zr, Ru, Rh, Pd, Os, Ir, Pt, Cu, Zn, Cr, Fe, Mg, Na, Ca, Ga, Ge, Al, Cr, Sr, Ag, Au, Hf, Sn, and a combination thereof. For example, the metal salt aqueous solution may be at least one selected from Mn, Ni, Co, and a combination thereof.

The metal salt aqueous solution may include an aqueous solution of at least one salt selected from sulfate, nitrate, acetate, halide, hydroxide, and a combination thereof. However, the metal salt aqueous solution is not limited thereto and may be any water-soluble salt used in the art.

The basic solution may be at least one selected from $Na_2CO_3$ aqueous solution, NaOH, KOH, $NH_4OH$, and a combination thereof.

The coprecipitation compound may be prepared to have a pH of about 8 to about 14, for example, a pH of about 8 to about 10, for example, a pH of about 8 to about 9. When the coprecipitation compound is prepared to have the pH in the range described above, a high-density coprecipitation compound may be obtained.

Thereafter, the coprecipitation compound may be mixed with a lithium salt to prepare the core capable of intercalation and deintercalation of lithium ions.

The lithium salt may include at least one selected from $Li_2CO_3$, $LiNO_3$, LiBr, LiCl, LiI, LiOH, $Li(CH_3CO_2)$, $LiH_2PO_4$, $LiOH—H_2O$, $Li(CH_3CO_2).2H_2O$, and a combination thereof.

For example, in a sodium battery, the core may be manufactured by using the method described below.

A metal precursor is dissolved in a solvent to prepare a first solution. The metal precursor may be at least two transition metal precursors selected from the group consisting of Groups 4 to 12 of the periodic table. The transition metal precursor may be, for example, a combination of Fe and Mn, a combination of Fe and Ni, a combination of Fe and Co, a combination of Fe and Ti, a combination of Mn and Ni, a combination of Mn and Co, a combination of Mn and Ti, a combination of Ni and Co, a combination of Ni and Ti, a combination of Co and Ti, a combination of Fe, Mn, and Ni, a combination of Fe, Mn, and Co, a combination of Fe, Mn, and Ti, a combination of Fe, Ni, and Co, a combination of Fe, Ni, and Ti, a combination of Fe, Co, and Ti, a combination of Fe, Mn, Ni, and Co, a combination of Fe, Mn, Ni, and Ti, or a combination of Fe, Mn, Ni, Co, and Ti. The metal precursor may be any compound that may be used in the art as a precursor containing a metal. For example, the metal precursor may be a compound such as a metal chloride, a metal nitrate, and metal sulfate, or a hydrate thereof.

Next, a second solution containing a precipitator and a chelating agent is added to the first solution, and the resulting solution is agitated to obtain a precipitate. Or the first solution is added to the second solution containing a precipitator and a chelating agent, and the resulting solution is agitated to obtain a precipitate. The first solution and the second solution may be, for example, an aqueous solution.

The precipitator may be, for example, LiOH, NaOH, KOH, $Li_2CO_3$, $Na_2CO_3$, $K_2CO_3$, or $(NH_2)_2CO$, but is not limited thereto. Any precipitator that may be used as a precipitator in the art may be used. The amount of the precipitator may be from about 20 to about 40 moles based on 1 mole of the total number of moles of the metal precursors included in the first solution (for example, the total number of moles of two transition metals precursors). The concentration of the precipitator in the second solution may be from about 0.5 to about 10 mol/L, for example, from about 1 to about 8 mol/L.

The chelating agent may be at least one selected from the group consisting of $NH_4OH$, tartaric acid, succinic acid, adipic acid, citric acid, triethanolamine, and polyvinylpyrrolidone. When the chelating agent makes a coordinate bond to a metal to stabilize the metal in a solution and precipitate the metal as a hydrate, a metal oxide having a uniform composition, for example, a metal oxide that has a layered rock salt structure having high crystallinity may be mainly obtained. The amount of the chelating agent may be 1.5 moles or more based on 1 mole of the total metal precursors included in the first solution, for example, from about 1.5 to about 10 moles based on 1 mole of the total metal precursors.

The precipitate may include two or more transition metals. The precipitate may be, for example, a hydroxide including two or more transition metals. The precipitate may be obtained as a slurry. A solid obtained by filtering the slurry may be recovered separately from a liquid. The recovered precipitate may be washed or dried. As a cleaning liquid, water or an aqueous organic solvent such as alcohol or acetone may be used. For example, water may be used as the cleaning liquid. Drying may be performed by heat drying, pneumatic drying, or vacuum drying. In the case of heat drying, drying temperature may be from about 50° C. to about 300° C., for example, from about 80° C. to about 200° C. The drying may be performed from about 10 to about 50 hours. The washing and drying may be performed two or more times.

Next, the precipitate and a sodium compound are mixed to obtain a mixture, and then the resulting mixture is calcined to prepare a core.

The sodium compound may be, for example, one selected from sodium hydroxide, sodium chloride, sodium nitrate, sodium peroxide, sodium sulfate, sodium hydrogen carbonate, sodium oxalate, and sodium carbonate, or a hydrate thereof. The amount of the sodium compound may be 0.2 or more and less than 1 by atomic ratio based on the total amount of the metals included in the precipitate.

The mixing may be performed by using a dry method or a wet method. For the sake of simplicity, the mixing may be performed by using a dry method. As a mixer, a stirring mixer, a V-shaped mixer, a W-shaped mixer, a ribbon mixer, a drum mixer, or a ball mill may be used.

The calcination may be performed from about 400 to about 1200° C. from about 0.1 to about 20 hours. For example, the temperature-increasing rate to the calcinations temperature may be from about 50° C./hr to about 400° C./hr. The temperature-decreasing rate to room temperature may be from about 10° C./hr to about 400° C./hr.

The calcination atmosphere may be, for example, air, oxygen, nitrogen, argon, or a combination thereof. For example, the calcinations atmosphere may be air. The resulting product of the calcinations may be pulverized by using a ball mill or a jet mill.

The calcinations and pulverization may be performed two or more times to prepare a core. In addition, the resulting product may be washed or sorted.

Next, the prepared core, the carbonaceous precursor having at least one hydroxy group or carboxyl group, and solvent may be mixed to chemically adsorb the carbonaceous precursor on at least one portion of the surface of the core.

The carbonaceous precursor may be a compound of a substituted or unsubstituted $C_6$-$C_{30}$ aromatic compound, a substituted or unsubstituted $C_5$-$C_{30}$ heterocyclic compound, or a combination thereof. For example, the carbon compound may be a substituted or unsubstituted benzene, a substituted or unsubstituted pentalene, a substituted or unsubstituted indene, a substituted or unsubstituted naphthalene, a substituted or unsubstituted azulene, a substituted or unsubstituted heptalene, a substituted or unsubstituted indacene, a substituted or unsubstituted acenaphthalene, a substituted or unsubstituted fluorene, a substituted or unsubstituted phenalene, a substituted or unsubstituted phenanthrene, a substituted or unsubstituted anthracene, a substituted or unsubstituted fluoranthene, a substituted or unsubstituted triphenylene, a substituted or unsubstituted pyrene, a substituted or unsubstituted chrysene, a substituted or unsubstituted naphthacene, a substituted or unsubstituted picene, a substituted or unsubstituted perylene, a substituted or unsubstituted pentaphene, a substituted or unsubstituted hexacene, a substituted or unsubstituted pyrrole, a substituted or unsubstituted pyrazole, a substituted or unsubstituted imidazole, a substituted or unsubstituted imidazolidine, a substituted or unsubstituted imidazopyrimidine, a substituted or unsubstituted pyridine, a substituted or unsubstituted pyrazine, a substituted or unsubstituted pyrimidine, a substituted or unsubstituted pyridazine, a substituted or unsubstituted indole, a substituted or unsubstituted purine, a substituted or unsubstituted quinoline, a substituted or unsubstituted phthalazine, a substituted or unsubstituted naphthyridine, a substituted or unsubstituted quinazoline, a substituted or unsubstituted cinnoline, a substituted or unsubstituted indazole, a substituted or unsubstituted carbazole, a substituted or unsubstituted phenazine, a substituted or unsubstituted phenanthridine, a substituted or unsubstituted triazine, a substituted or unsubstituted phenanthroline, or a substituted or unsubstituted quinoxaline. For example, the carbonaceous precursor may be a substituted or unsubstituted benzene, a substituted or unsubstituted naphthalene, a substituted or unsubstituted phenalene, a substituted or unsubstituted phenanthrene, a substituted or unsubstituted anthracene, a substituted or unsubstituted triphenylene, a substituted or unsubstituted pyrene, a substituted or unsubstituted chrysene, a substituted or unsubstituted naphthacene, a substituted or unsubstituted picene, a substituted or unsubstituted perylene, a substituted or unsubstituted pentaphene, a substituted or unsubstituted hexacene, a substituted or unsubstituted pyridine, a substituted or unsubstituted pyrazine, a substituted or unsubstituted pyrimidine, a substituted or unsubstituted pyridazine, a substituted or unsubstituted quinoline, a substituted or unsubstituted phthalazine, a substituted or unsubstituted quinoxaline, a substituted or unsubstituted quinazoline, a substituted or unsubstituted cinnoline, a substituted or unsubstituted phenanthridine, a substituted or unsubstituted phenanthroline, or a substituted or unsubstituted phenazine.

The term "substituted" as used herein refers to substitution with a $C_1$-$C_{20}$ alkyl group substituted with a halogen atom (examples: $CCF_3$, $CHCF_2$, $CH_2F$, and $CCl_3$), a hydroxy group, a nitro group, a cyano group, an amino group, an amidino group, a hydrazine, a hydrazone, a carboxyl group or a salt thereof, a sulfonic acid group or a salt thereof, or a phosphoric acid or a salt thereof, or substitution with a $C_1$-$C_{20}$ alkyl group, a $C_2$-$C_{20}$ alkenyl group, a $C_2$-$C_{20}$ alkynyl group, a $C_1$-$C_{20}$ heteroalkyl group, a $C_6$-$C_{20}$ aryl group, a $C_6$-$C_{20}$ arylalkyl group, a $C_6$-$C_{20}$ heteroaryl group, or a $C_6$-$C_{20}$ heteroarylalkyl group.

The solvent does not chemically react with the core and the carbonaceous precursor, is removable at a relatively low temperature, and may be selected from solvents that may act as a medium that facilitates an effective contact between the core and the carbonaceous precursor. The solvent may be for example, acetone, ethanol, and distilled water, but the solvent is not limited thereto.

The process of chemically adsorbing the carbonaceous precursor on at least one portion of the surface of the core may occur via a chemical bond formed by a dehydration reaction between a hydroxy group of the surface of the core and a hydroxy group or a carboxyl group of the carbonaceous precursor.

The dehydration reaction may occur at room temperature, but for a rapid dehydration reaction, a heat treatment process may be further performed. The heat treatment may vary depending on the composition and the amount of the core and the carbonaceous precursor, and the heat treatment may be performed in, for example, an inert atmosphere (for example, an atmosphere including at least one of nitrogen, argon, and a mixture of nitrogen and hydrogen gas) and at a temperature of about 200° C. to about 400° C. for about 1 hour to about 5 hours. For example, the heat treatment may be performed in a nitrogen atmosphere at a temperature of about 300° C. for about 2 hours.

Next, the core on which the carbonaceous precursor is chemically adsorbed is heat treated to form a non-conductive carbonaceous film containing oxygen. The heat treatment may be performed in an inert atmosphere (for example, an atmosphere including at least one of nitrogen, argon, and a mixture of nitrogen and hydrogen gas) and at a temperature of about 400° C. to about 800° C. for about 1 hour to about 5 hours.

For example, the heat treatment may be performed in a nitrogen atmosphere at a temperature of about 500° C. to about 700° C. for about 2 hours. The carbonaceous precursor having at least one hydroxy group or carboxyl group may form the non-conductive carbonaceous film containing oxygen through a heat treatment at a relatively low temperature as in the range described above. When the carbonaceous precursor is heat treated and carbonized at such low temperature, a uniformly thin non-conductive carbonaceous film containing oxygen may be formed without substantially affecting the structure of the core.

Hereinafter, detailed embodiments will be provided. However, the embodiments disclosed below are for illustrative purposes only and shall not limit the scope of this disclosure.

Also, contents that are not disclosed herein may be deduced by one of ordinary skill the art, and thus, descriptions thereof will be omitted.

EXAMPLES (Preparation of Positive Active Material)

Example 1: Preparation of Positive Active Material

Each of 2 M nickel sulfate aqueous solution ($NiSO_4 \cdot 6(H_2O)$, a product of Aldrich), 2 M cobalt sulfate aqueous solution ($CoSO_4 \cdot 7(H_2O)$, a product of Aldrich), and 2 M manganese sulfate aqueous solution ($MnSO_4 \cdot x(H_2O)$, a product of Aldrich) was prepared. Thereafter, the nickel sulfate aqueous solution, the cobalt sulfate aqueous solution, and the manganese sulfate aqueous solution were mixed in a molar ratio of nickel, cobalt, and manganese in a mixture solution of the nickel sulfate aqueous solution, the cobalt sulfate aqueous solution, and the manganese sulfate aqueous solution equal to 6:1:3. The mixed solution and 2 M $Na_2CO_3$ aqueous solution were put into 4 L of 0.2 M $NH_4OH$ solution and then agitated at a speed of 3 mL/min to react the same for 10 hours at pH 8 and the precipitate obtained therefrom was filtered. The precipitate was then washed with water, dried, and then mixed with $Li_2CO_3$ (a product of Aldrich) in a molar ratio of Li:Ni:Co:Mn equal to 1.0:0.6:0.1:0.3. Then, the precipitate was heat treated at a temperature of 900° C. in the atmosphere for 6 hours to obtain a lithium metal oxide ($LiNi_{0.6}Co_{0.1}Mn_{0.3}O_2$) core.

Thereafter, 100 parts by weight of the lithium metal oxide ($LiNi_{0.6}Co_{0.1}Mn_{0.3}O_2$) core, 0.02 parts by weight of 2,3-dihydroxynaphthalene (DN) as a carbonaceous precursor, and 0.5 parts by weight of acetone as a solvent were mixed, agitated, and then dried to obtain a mixture. The mixture was first heat treated in $N_2$ atmosphere at a temperature of 300° C. for 2 hours, a dehydration reaction of the core and 2,3-dihydroxynaphthalene was performed, the temperature was increased to 600° C., and then the mixture second heat treated at 600° C. for 2 hours to prepare a positive active material that included the lithium metal oxide ($LiNi_{0.6}Co_{0.1}Mn_{0.3}O_2$) core and a non-conductive carbonaceous film containing oxygen formed thereon.

Example 2: Preparation of Positive Active Material

A positive active material was manufactured in the same manner as in Example 1, except that 100 parts by weight of lithium metal oxide ($LiNi_{0.6}Co_{0.1}Mn_{0.3}O_2$) core, 0.04 parts by weight of 2,3-dihydroxynaphthalene (DN) as a carbonaceous precursor, and 0.5 parts by weight of acetone as a solvent were used instead of 100 parts by weight of the lithium metal oxide ($LiNi_{0.6}Co_{0.1}Mn_{0.3}O_2$) core, 0.02 parts by weight of 2,3-dihydroxynaphthalene (DN) as a carbonaceous precursor, and 0.5 parts by weight of acetone as a solvent.

Example 3: Preparation of Positive Active Material

A positive active material was manufactured in the same manner as in Example 1, except that 100 parts by weight of lithium metal oxide ($LiNi_{0.6}Co_{0.1}Mn_{0.3}O_2$) core, 0.1 parts by weight of 2,3-dihydroxynaphthalene (DN) as a carbonaceous precursor, and 0.5 parts by weight of acetone as a solvent were used instead of 100 parts by weight of the lithium metal oxide ($LiNi_{0.6}Co_{0.1}Mn_{0.3}O_2$) core, 0.02 parts by weight of 2,3-dihydroxynaphthalene (DN) as a carbonaceous precursor, and 0.5 parts by weight of acetone as a solvent.

Example 4: Preparation of Positive Active Material 100 parts by weight of the lithium metal oxide ($LiNi_{0.6}Co_{0.1}Mn_{0.3}O_2$) core obtained in Example 1, 0.04 parts by weight of 2,3-dihydroxynaphthalene (DN) as a carbonaceous precursor, and 0.5 parts by weight of acetone as a solvent were mixed, agitated, and then dried to obtain a mixture. The mixture was first heat treated in a $N_2$ atmosphere at a temperature of 300° C. for 2 hours to perform a dehydration reaction between the core and 2,3-dihydroxynaphthalene, increased temperature to 500° C. and second heat treated at a temperature of 500° C. for 2 hours to prepare a positive active material that included the lithium metal oxide ($LiNi_{0.6}Co_{0.1}Mn_{0.3}O_2$) core and a non-conductive carbonaceous film containing oxygen formed thereon.

Example 5: Preparation of Positive Active Material 100 parts by weight of the lithium metal oxide ($LiNi_{0.6}Co_{0.1}Mn_{0.3}O_2$) core obtained in Example 1, 0.04 parts by weight of 2,3-dihydroxynaphthalene (DN) as a carbonaceous precursor, and 0.5 parts by weight of acetone as a solvent were mixed, agitated, and then dried to obtain a mixture. The mixture was first heat treated in a $N_2$ atmosphere at a temperature of 300° C. for 2 hours to perform a dehydration reaction between the core and 2,3-dihydroxynaphthalene, increased temperature to 700° C., and second heat treated at a temperature of 700° C. for 2 hours to prepare a positive active material that included the lithium metal oxide ($LiNi_{0.6}Co_{0.1}Mn_{0.3}O_2$) core and a non-conductive carbonaceous film containing oxygen formed thereon.

Example 6: Preparation of Positive Active Material 100 parts by weight of the lithium metal oxide ($LiNi_{0.6}Co_{0.1}Mn_{0.3}O_2$) core obtained in Example 1, 0.04 parts by weight of 2,3-dihydroxynaphthalene (DN) as a carbonaceous precursor, and 0.5 parts by weight of acetone as a solvent were mixed, agitated, and then dried to obtain a mixture. The mixture was first heat treated in a $N_2$ atmosphere at a temperature of 300° C. for 2 hours to perform a dehydration reaction between the core and 2,3-dihydroxynaphthalene, the temperature was increased to 800° C., and then the mixture was second heat treated at a temperature of 800° C. for 2 hours to prepare a positive active material that included the lithium metal oxide ($LiNi_{0.6}Co_{0.1}Mn_{0.3}O_2$) core and a non-conductive carbonaceous film containing oxygen formed thereon.

Example 7: Preparation of Positive Active Material

A 2M nickel sulfate aqueous solution ($NiSO_4 \cdot 6(H_2O)$, a product of Aldrich), a 2M cobalt sulfate aqueous solution ($CoSO_4 \cdot 7(H_2O)$, a product of Aldrich), and a 2M manganese sulfate aqueous solution ($MnSO_4 \cdot x(H_2O)$, a product of Aldrich) were prepared. Then, the nickel sulfate aqueous solution, the cobalt sulfate aqueous solution, and the manganese sulfate aqueous solution were mixed in a molar ratio of nickel, cobalt, and manganese in a mixture solution of the nickel sulfate aqueous solution, the cobalt sulfate aqueous solution, and the manganese sulfate aqueous solution equal to 0.25:0.1:0.65. The mixed solution was added to 4 L of a 0.2M $NH_4OH$ solution together with a 2M $Na_2CO_3$ aqueous solution at a speed of 3 mL/min. Then, while a pH of 14 was maintained, a reaction was carried out for 10 hours. The obtained precipitate was filtered out. The precipitate was washed with water and dried, and then mixed with $Li_2CO_3$ (a product of Aldrich) such that a molar ratio of Li:Ni:Co:Mn is 1.4:0.25:0.1:0.65. The resultant mixture was heat treated at a temperature of 700° C. in the atmosphere for 6 hours to obtain a lithium metal oxide ($Li_{1.4}Ni_{0.25}Co_{0.1}Mn_{0.65}O_2$) core.

Then, 100 parts by weight of the lithium metal oxide ($Li_{1.4}Ni_{0.25}Co_{0.1}Mn_{0.65}O_2$) core, 0.01 parts by weight of 2,3-dihydroxynaphthalene (DN) as a carbonaceous precursor and 0.5 parts by weight of acetone as a solvent were mixed, stirred, and then dried to obtain a mixture. The mixture was first heat treated in $N_2$ atmosphere at a temperature of 300° C. for 2 hours to perform a dehydration reaction between the core and 2,3-dihydroxynaphthalene, and the temperature was raised to 500° C., and at the temperature of 500° C., the result was second heat treated for 2 hours to prepare a positive active material that includes the lithium metal oxide ($Li_{1.4}Ni_{0.25}Co_{0.1}Mn_{0.65}O_2$) core and a non-conductive carbonaceous film containing oxygen formed thereon.

Example 8: Preparation of Positive Active Material 100 parts by weight of the lithium metal oxide ($Li_{1.4}Ni_{0.25}Co_{0.1}Mn_{0.65}O_2$) core prepared in Example 7, 0.05 part by weight of 2,3-dihydroxynaphthalene (DN) as a carbonaceous precursor and 0.5 parts by weight of acetone as a solvent were mixed, stirred, and then dried to obtain a mixture. The mixture was first heat treated in $N_2$ atmosphere at a temperature of 300° C. for 2 hours to perform a dehydration reaction between the core and 2,3-dihydroxynaphthalene, and the temperature was raised to 500° C., and at the temperature of 500° C., the result was second heat treated for 2 hours to prepare a positive active material that includes the lithium metal oxide ($Li_{1.4}Ni_{0.25}Co_{0.1}Mn_{0.65}O_2$) core and a non-conductive carbonaceous film containing oxygen formed thereon.

Example 9: Preparation of Positive Active Material 100 parts by weight of the lithium metal oxide ($Li_{1.4}Ni_{0.25}Co_{0.1}Mn_{0.65}O_2$) core prepared in Example 7, 0.2 parts by weight of 2,3-dihydroxynaphthalene (DN) as a carbonaceous precursor and 0.5 parts by weight of acetone as a solvent were mixed, stirred, and then dried to obtain a mixture. The mixture was first heat treated in $N_2$ atmosphere at a temperature of 300° C. for 2 hours to perform a dehydration reaction between the core and 2,3-dihydroxynaphthalene, and the temperature was raised to 500° C., and at the temperature of 500° C., the result was second heat treated for 2 hours to prepare a positive active material that includes the lithium metal oxide ($Li_{1.4}Ni_{0.25}Co_{0.1}Mn_{0.65}O_2$) core and a non-conductive carbonaceous film containing oxygen formed thereon.

Example 10: Preparation of Positive Active Material 100 parts by weight of the lithium metal oxide ($Li_{1.4}Ni_{0.25}Co_{0.1}Mn_{0.65}O_2$) core prepared in Example 7, 0.2 parts by weight of 2,3-dihydroxynaphthalene (DN) as a carbonaceous precursor and 0.5 parts by weight of acetone as a solvent were mixed, stirred, and then dried to obtain a mixture. The mixture was first heat treated in $N_2$ atmosphere at a temperature of 300° C. for 2 hours to perform a dehydration reaction between the core and 2,3-dihydroxynaphthalene, and the temperature was raised to a temperature of 550° C., and at the temperature of 550° C., the result was second heat treated for 2 hours to prepare a positive active material that includes the lithium metal oxide ($Li_{1.4}Ni_{0.25}Co_{0.1}Mn_{0.65}O_2$) core and a non-conductive carbonaceous film containing oxygen formed thereon.

Example 11: Preparation of Positive Active Material 100 parts by weight of the lithium metal oxide ($Li_{1.4}Ni_{0.25}Co_{0.1}Mn_{0.65}O_2$) core prepared in Example 7, 0.2 parts by weight of 2,3-dihydroxynaphthalene (DN) as a carbonaceous precursor and 0.5 parts by weight of acetone as a solvent were mixed, stirred, and then dried to obtain a mixture. The mixture was first heat treated in $N_2$ atmosphere at a temperature of 300° C. for 2 hours to perform a dehydration reaction between the core and 2,3-dihydroxynaphthalene, and the temperature was raised to a temperature of 450° C., and at the temperature of 450° C., the result was second heat treated for 2 hours to prepare a positive active material that includes the lithium metal oxide ($Li_{1.4}Ni_{0.25}Co_{0.1}Mn_{0.65}O_2$) core and a non-conductive carbonaceous film containing oxygen formed thereon.

Example 12: Preparation of Positive Active Material 100 parts by weight of the lithium metal oxide ($Li_{1.4}Ni_{0.25}Co_{0.1}MnO_{0.65}O_2$) core prepared in Example 7, 0.2 parts by weight of 2,3-dihydroxynaphthalene (DN) as a carbonaceous precursor and 0.5 parts by weight of acetone as a solvent were mixed, stirred, and then dried to obtain a mixture. The mixture was first heat treated in $N_2$ atmosphere at a temperature of 300° C. for 2 hours to perform a dehydration reaction between the core and 2,3-dihydroxynaphthalene, and the temperature was raised to a temperature of 400° C., and at the temperature of 400° C., the result was second heat treated for 2 hours to prepare a positive active material that includes the lithium metal oxide ($Li_{1.4}Ni_{0.25}Co_{0.1}Mn_{0.65}O_2$) core and a non-conductive carbonaceous film containing oxygen formed thereon.

Example 13: Preparation of Positive Active Material 200 mL of distilled water was put into a polypropylene beaker, and then 1.69 g of $MnSO_4 \cdot H_2O$ and 2.78 g of $FeSO_4 \cdot 7H_2O$ were added to the beaker. The resulting mixture was agitated to prepare a first aqueous solution.

250 mL of distilled water was put into a separate polypropylene beaker, and 12 g of sodium hydroxide (NaOH), which was an amount corresponding to 0.3 mole based on the total number of moles of the $MnSO_4 \cdot H_2O$ and $FeSO_4 \cdot 7H_2O$ (0.02 mole), was added. Subsequently, 4.87 g of 28% ammonium hydroxide ($NH_4OH$), which was the amount corresponding to 0.04 mole based on the total number of moles of the $MnSO_4 \cdot H_2O$ and $FeSO_4 \cdot 7H_2O$ (0.02 mole), was added. Then, the resulting mixture was agitated to completely dissolve NaOH and $NH_4OH$ and thereby prepare a second aqueous solution.

While stirring the second aqueous solution, the first aqueous solution was dripped to the second aqueous solution to obtain a slurry including a precipitate.

Next, the slurry was filtered and washed with distilled water. Then, the resulting product was dried at 100° C. for 24 hours to obtain the precipitate. The composition of the precipitate was analyzed by ICP (inductively coupled plasma) emission spectroscopy, and the result showed that the Fe:Mn molar ratio was 0.5:0.5. Then, the precipitate and sodium carbonate were weighed at the Fe:Na molar ratio of 0.5:0.67, and mixed by using a dry method by using an agate mortar with a pestle to obtain a mixture. Then, the resulting mixture was put into an alumina calcinations container to perform calcinations by using an electric furnace in an air atmosphere at 850° C. for 12 hours. Then, the calcination product was cooled down to room temperature to obtain a $Na_{2/3}Fe_{0.5}Mn_{0.5}O_2$ metal oxide core.

Next, 100 parts by weight of the $Na_{2/3}Fe_{0.5}Mn_{0.5}O_2$ metal oxide core, 0.2 parts by weight of 2,3-dihydroxynaphthalene (DN) as a carbonaceous precursor, and 0.5 parts by weight of acetone as a solvent were mixed, agitated, and then dried to obtain a mixture. The mixture was first heat treated in a $N_2$ atmosphere at a temperature of 300° C. for 2 hours, a dehydration reaction of the core and 2,3-dihydroxynaphthalene was performed, the temperature was increased to 600° C., and then the mixture was second heat treated at 600° C. for 2 hours to prepare a positive active material in which a non-conductive carbonaceous film containing oxygen in the $Na_2/3Fe_{0.5}Mn_{0.5}O_2$ metal oxide core was formed.

Comparative Example 1: Preparation of Positive Active Material

Each of 2 M nickel sulfate aqueous solution ($NiSO_4 \cdot 6(H_2O)$, a product of Aldrich), 2 M cobalt sulfate aqueous solution ($CoSO_4 \cdot 7(H_2O)$, a product of Aldrich), and 2 M manganese sulfate aqueous solution ($MnSO_4 \cdot x(H_2O)$, a product of Aldrich) was prepared. Thereafter, the nickel sulfate aqueous solution, the cobalt sulfate aqueous solution, and the manganese sulfate aqueous solution were mixed to prepare a mixture solution with a molar ratio of nickel, cobalt, and manganese in the mixture solution of the nickel sulfate aqueous solution, the cobalt sulfate aqueous solution and the manganese sulfate aqueous solution equal to 6:1:3. The mixture solution and 2 M $Na_2CO_3$ aqueous solution were put into 4 L of 0.2 M $NH_4OH$ solution, agitated the same at a speed of 3 mL/min, reacted the same at pH 8 for 10 hours and then the precipitate obtained therefrom was filtered. The precipitate was washed with water, dried, and then mixed with $Li_2CO_3$ (a product of Aldrich) such that a molar ratio of Li:Ni:Co:Mn was 1.0:0.6:0.1:0.3, and then the same was heat treated in a 900° C. atmosphere for 6 hours to prepare a positive active material of lithium metal oxide ($LiNi_{0.6}Co_{0.1}Mn_{0.3}O_2$).

Comparative Example 2: Preparation of Positive Active Material

A positive active material was manufactured in the same manner as in Example 1, except that 100 parts by weight of lithium metal oxide ($LiNi_{0.6}Co_{0.1}Mn_{0.3}O_2$) core, 0.2 parts by weight of 2,3-dihydroxynaphthalene (DN) as a carbonaceous precursor, and 0.5 parts by weight of acetone as a solvent were used instead of 100 parts by weight of the lithium metal oxide ($LiNi_{0.6}Co_{0.1}Mn_{0.3}O_2$) core, 0.02 parts by weight of 2,3-dihydroxynaphthalene (DN) as a carbonaceous precursor, and 0.5 parts by weight of acetone as a solvent.

Comparative Example 3: Preparation of Positive Active Material

A positive active material was manufactured in the same manner as in Example 1, except that 100 parts by weight of lithium metal oxide ($LiNi_{0.6}Co_{0.1}Mn_{0.3}O_2$) core, 0.4 parts by weight of 2,3-dihydroxynaphthalene (DN) as a carbonaceous precursor, and 0.5 parts by weight of acetone as a solvent were used instead of 100 parts by weight of the lithium metal oxide ($LiNi_{0.6}Co_{0.1}Mn_{0.3}O_2$) core, 0.02 parts by weight of 2,3-dihydroxynaphthalene (DN) as a carbonaceous precursor, and 0.5 parts by weight of acetone as a solvent.

Comparative Example 4: Preparation of Positive Active Material

A positive active material was manufactured in the same manner as in Example 1, except that 100 parts by weight of lithium metal oxide ($LiNi_{0.6}Co_{0.1}Mn_{0.3}O_2$) core, 1.0 part by weight of 2,3-dihydroxynaphthalene (DN) as a carbonaceous precursor, and 0.5 parts by weight of acetone as a solvent were used instead of 100 parts by weight of the lithium metal oxide ($LiNi_{0.6}Co_{0.1}Mn_{0.3}O_2$) core, 0.02 parts by weight of 2,3-dihydroxynaphthalene (DN) as a carbonaceous precursor, and 0.5 parts by weight of acetone as a solvent.

Comparative Example 5: Preparation of Positive Active Material

A 2M nickel sulfate aqueous solution ($NiSO_4 \cdot 6(H_2O)$, a product of Aldrich Company), a 2M cobalt sulfate aqueous solution ($CoSO_4 \cdot 7(H_2O)$, a product of Aldrich Company), and a 2M manganese sulfate aqueous solution ($MnSO_4 \cdot x(H_2O)$, a product of Aldrich Company) were prepared. Then, the nickel sulfate aqueous solution, the cobalt sulfate aqueous solution, and the manganese sulfate aqueous solution were mixed in a molar ratio of nickel, cobalt, and manganese in a mixture solution of the nickel sulfate aqueous solution, the cobalt sulfate aqueous solution, and the manganese sulfate aqueous solution equal to 0.25:0.1:0.65. The mixed solution was added to 4 L of a 0.2M $NH_4OH$ solution together with a 2M $Na_2CO_3$ aqueous solution at a speed of 3 mL/min. Then, while a pH of 8 was maintained, a reaction was carried out for 10 hours.

The obtained precipitate was filtered out. The precipitate was washed with water and dried, and then mixed with $Li_2CO_3$ (a product of Aldrich Company) such that a molar ratio of Li:Ni:Co:Mn is 1.4:0.25:0.1:0.65. The resultant mixture was heat treated at a temperature of 900° C. in the atmosphere for 6 hours to obtain a positive active material including a lithium metal oxide ($Li_{1.4}Ni_{0.25}Co_{0.1}Mn_{0.65}O_2$).

Comparative Example 6: Preparation of Positive Active Material 200 mL of distilled water was put into a polypropylene beaker, and then 1.69 g of $MnSO_4 \cdot H_2O$ and 2.78 g of $FeSO_4 \cdot 7H_2O$ were added to the beaker. The resulting mixture was agitated to prepare a first aqueous solution.

250 mL of distilled water was put into a separate polypropylene beaker, and 12 g of sodium hydroxide (NaOH), which was an amount corresponding to 0.3 mole based on the total number of moles of the MnSO$_4$·H$_2$O and FeSO$_4$·7H$_2$O (0.02 mole), was added. Subsequently, 4.87 g of 28% ammonium hydroxide (NH$_4$OH), which was the amount corresponding to 0.04 mole based on the total number of moles of the MnSO$_4$·H$_2$O and FeSO$_4$·7H$_2$O (0.02 mole), was added. Then, the resulting mixture was agitated to completely dissolve NaOH and NH$_4$OH and thereby prepare a second aqueous solution.

While stirring the second aqueous solution, the first aqueous solution was dripped to the second aqueous solution to obtain a slurry including a precipitate.

Next, the slurry was filtered and washed with distilled water. Then, the resulting product was dried at 100° C. for 24 hours to obtain the precipitate. The composition of the precipitate was analyzed by ICP (inductively coupled plasma) emission spectroscopy, and the result showed that the Fe:Mn molar ratio was 0.5:0.5. Then, the precipitate and sodium carbonate were weighed at the Fe:Na molar ratio of 0.5:0.67, and mixed by using a dry method by using an agate mortar with a pestle to obtain a mixture. Then, the resulting mixture was put into an alumina calcinations container to perform calcinations by using an electric furnace in air atmosphere at 850° C. for 12 hours. Then, the calcination product was cooled down to room temperature to obtain Na$_{2/3}$Fe$_{0.5}$Mn$_{0.502}$ metal oxide core.

The positive active materials manufactured in Examples 1 to 13 and Comparative Examples 1 to 6 are shown in Table 1 below.

TABLE 1

| | Core component | carbonaceous precursor | Amount of carbonaceous precursor (parts by weight) based on 100 parts by weight of the core | Second heat treatment temperature (° C.) |
|---|---|---|---|---|
| Example 1 | LiNi$_{0.6}$Co$_{0.1}$Mn$_{0.3}$O$_2$ | DN | 0.02 | 600 |
| Example 2 | LiNi$_{0.6}$Co$_{0.1}$Mn$_{0.3}$O$_2$ | DN | 0.04 | 600 |
| Example 3 | LiNi$_{0.6}$Co$_{0.1}$Mn$_{0.3}$O$_2$ | DN | 0.1 | 600 |
| Example 4 | LiNi$_{0.6}$Co$_{0.1}$Mn$_{0.3}$O$_2$ | DN | 0.04 | 500 |
| Example 5 | LiNi$_{0.6}$Co$_{0.1}$Mn$_{0.3}$O$_2$ | DN | 0.04 | 700 |
| Example 6 | LiNi$_{0.6}$Co$_{0.1}$Mn$_{0.3}$O$_2$ | DN | 0.04 | 800 |
| Example 7 | Li$_{1.4}$Ni$_{0.25}$Co$_{0.1}$Mn$_{0.65}$O$_2$ | DN | 0.01 | 500 |
| Example 8 | Li$_{1.4}$Ni$_{0.25}$Co$_{0.1}$Mn$_{0.65}$O$_2$ | DN | 0.05 | 500 |
| Example 9 | Li$_{1.4}$Ni$_{0.25}$Co$_{0.1}$Mn$_{0.65}$O$_2$ | DN | 0.2 | 500 |
| Example 10 | Li$_{1.4}$Ni$_{0.25}$Co$_{0.1}$Mn$_{0.65}$O$_2$ | DN | 0.2 | 550 |
| Example 11 | Li$_{1.4}$Ni$_{0.25}$Co$_{0.1}$Mn$_{0.65}$O$_2$ | DN | 0.2 | 450 |
| Example 12 | Li$_{1.4}$Ni$_{0.25}$Co$_{0.1}$Mn$_{0.65}$O$_2$ | DN | 0.2 | 400 |
| Example 13 | Na$_{2/3}$Fe$_{0.5}$Mn$_{0.5}$O$_2$ | DN | 0.2 | 600 |
| Comparative Example 1 | LiNi$_{0.6}$Co$_{0.1}$Mn$_{0.3}$O$_2$ | — | — | — |
| Comparative Example 2 | LiNi$_{0.6}$Co$_{0.1}$Mn$_{0.3}$O$_2$ | DN | 0.2 | 600 |
| Comparative Example 3 | LiNi$_{0.6}$Co$_{0.1}$Mn$_{0.3}$O$_2$ | DN | 0.4 | 600 |
| Comparative Example 4 | LiNi$_{0.6}$Co$_{0.1}$Mn$_{0.3}$O$_2$ | DN | 1.0 | 600 |
| Comparative Example 6 | Na$_{2/3}$Fe$_{0.5}$Mn$_{0.5}$O$_2$ | — | — | — |

(Manufacturing a Lithium Battery)

Example 14: Manufacturing a Lithium Half-Cell

A powder of the positive active material of Example 1 and carbon conductive material (Super P) were uniformly mixed to prepare a mixture, and a pyrrolidone solution including 5 wt % of PVDF(polyvinylidene fluoride) binder (SOLEF 5130) was added thereto to prepare a slurry having a weight ratio of positive active material:carbon conductive material: binder=90:6:4.

The slurry was bar-coated to a thickness of about 40 μm to about 50 μm on an aluminum foil having a thickness of 15 μm, dried, and then dried again in a vacuum atmosphere at a temperature of about 120° C. to manufacture a positive electrode plate. The positive electrode plate was roll-pressed to manufacture a sheet-type positive electrode for a coin-cell. In this regard, a capacity of the positive electrode was 2.0 mAh/cm$^2$.

The positive electrode was used to manufacture a coin-type lithium half-cell (CR2032 type) having a diameter of about 12 mm.

When manufacturing the cell, a metal lithium was used as a counter electrode and lithium salt of 1.1 M LiPF$_6$ and 0.2 M LiBF$_4$ dissolved in a mixture solvent of EC (ethylene carbonate):DEC (diethyl carbonate):FEC (fluoroethylene carbonate) (a volume ratio of 2:6:2) was used as an electrolyte.

Examples 15 to 25: Manufacturing a Lithium Half-Cell

A coin-type lithium half-cell (CR2032 type) was manufactured in the same manner as in Example 14, except that powders of the positive active materials manufactured in Examples 2 to 12 were used respectively, instead of the powder of the positive active material of Example 1.

Comparative Examples 7 to 11: Manufacturing a Lithium Half-Cell

A coin-type lithium half-cell (CR2032 type) was manufactured in the same manner as in Example 14, except that powders of the positive active materials manufactured in Comparative Example 1 to 5 were used respectively, instead of the positive active material of Example 1.

(Manufacture of Sodium Battery)

Example 26: Manufacturing Sodium Half Cell

A powder of the positive active material of Example 13 and carbon conductive material (Super P) were uniformly mixed to prepare a mixture, and a polyvinylidene fluoride (PVDF) binder (SOLEF 5130) was added thereto together with N-methylpyrrolidone (NMP) in an agate mortar to prepare a slurry having a weight ratio of positive active material:carbon conductive material:binder=60:20:20.

The slurry was bar-coated on an aluminum foil having a thickness of 15 μm, dried, and then dried at room temperature, and then dried again at a temperature of 120° C. The resultant plate was pressed and punched to manufacture a positive electrode plate having a thickness of 55 μm. The positive electrode plate was roll-pressed to manufacture a sheet-shaped positive electrode for a coin cell.

The positive electrode was used to manufacture a coin-type sodium half cell (CR2032 type) having a diameter of about 12 mm.

When manufacturing the cell, sodium foil was used as a counter electrode, a glass fiber separator (Whatman GF/F CAT No. 1825-150) was used as a separator, and a solution of 1.0 M NaPF$_6$ dissolved in a propylene carbonate (PC) was used as an electrolyte.

Comparative Example 12: Manufacturing Sodium Half Cell

A coin-type sodium half cell (CR2032 type) was manufactured in the same manner as in Example 26, except that the positive active material of Comparative Example 6 was used instead of the positive active material of Example 13.

(Positive Active Material Surface Analysis)

Analysis Example 1: Scanning Electron Microscope (SEM) Image and Transmission Electron Microscope (TEM) Image Surfaces of the positive active materials manufactured in Example 1 and Comparative Examples 1 and 2 were observed by using a scanning electron microscope. The results thereof are respectively shown in FIGS. 2A to 2C.

Figure 2A:
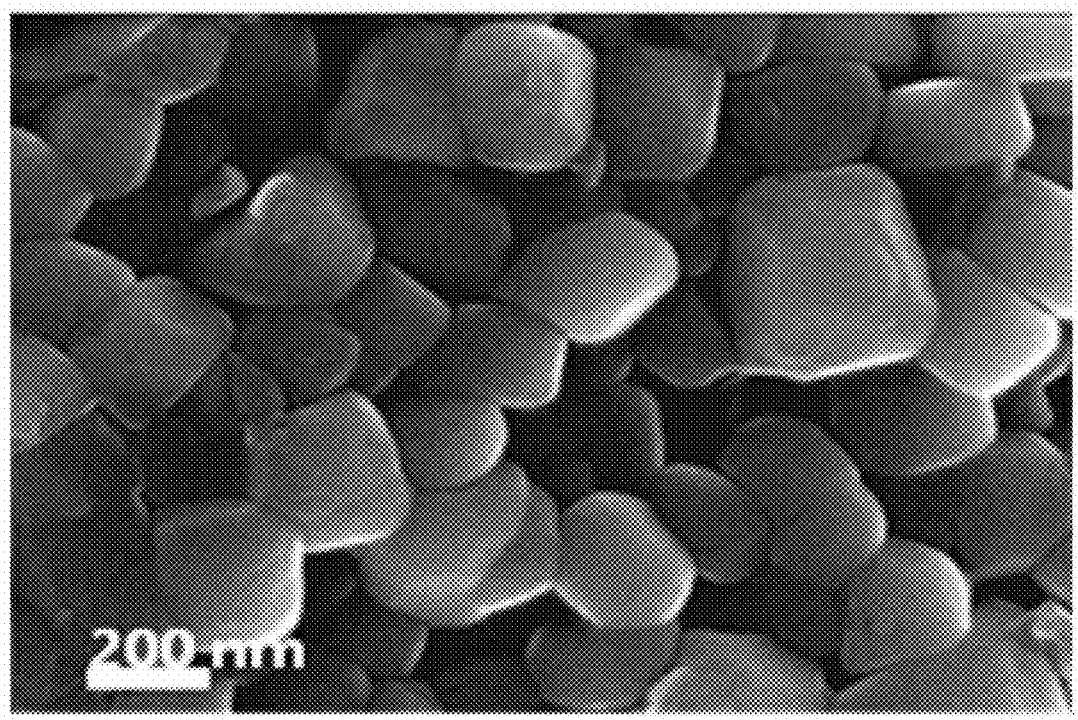
FIG. 2A is a scanning electron microscope (SEM) image of the positive active material prepared in Example 1.
Figure 2B:
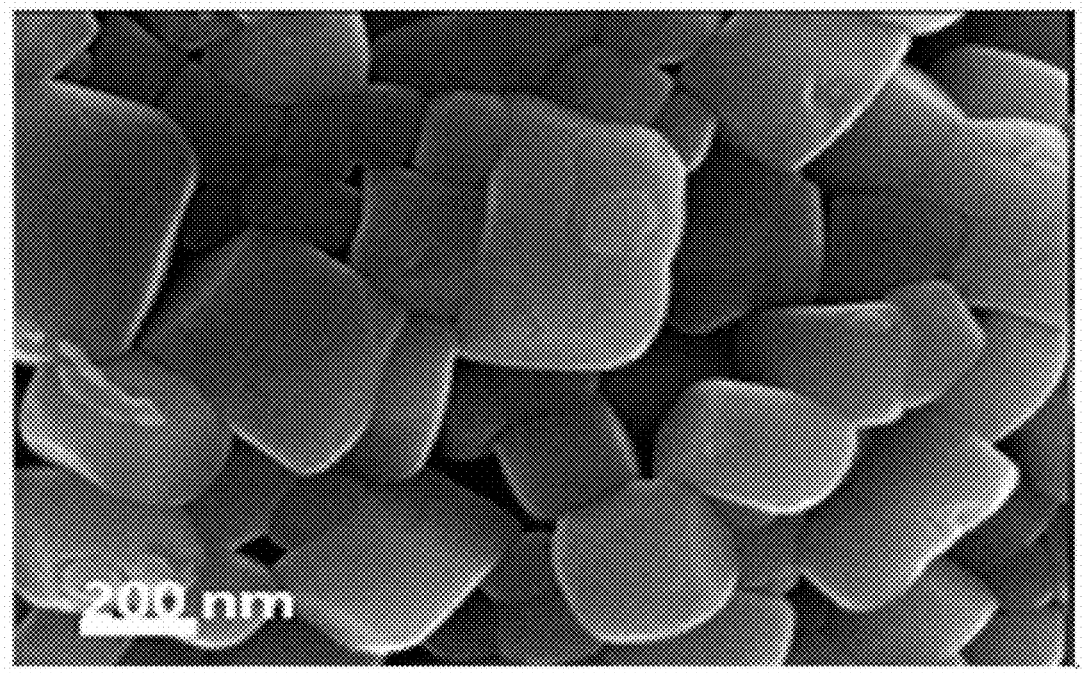
FIG. 2B is an SEM image of the positive active material prepared in Comparative Example 1.
Figure 2C:
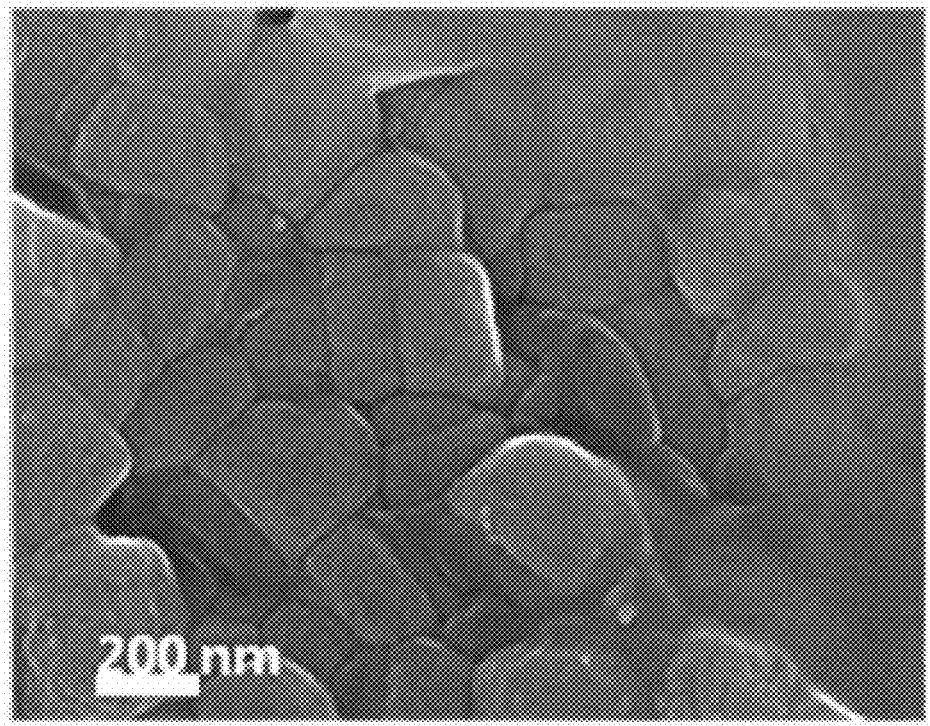
FIG. 2C is an SEM image of the positive active material prepared in Comparative Example 2.

Referring to FIGS. 2A to 2C, the positive active material manufactured in FIG. 2A had a uniformly thin non-conductive carbonaceous film thereon such that it was difficult to distinguish the non-conductive carbonaceous film from the surface of the positive active material manufactured in FIG. 2B. However, the surface of the positive active material manufactured in FIG. 2C had a thick non-conductive carbonaceous film formed thereon such that the non-conductive carbonaceous film covered portions of the core.

Also, the surface of the positive active material manufactured in Examples 1, 9, and Comparative Example 5 was analyzed by using a high resolution transmission electron microscope (HR-TEM). The results are shown in FIGS. 3, 4A, and 4B.

Figure 3:
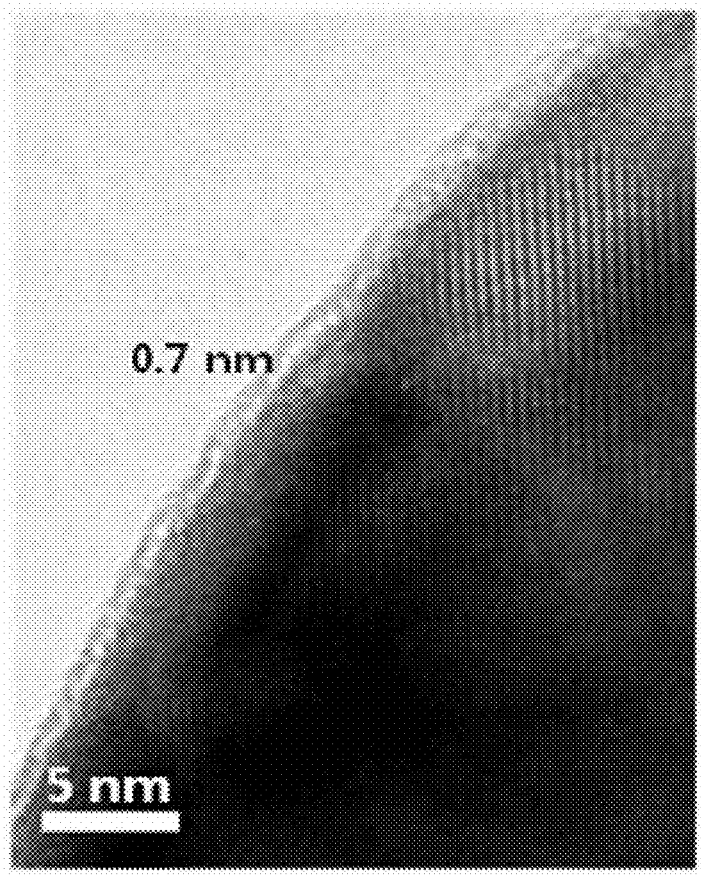
FIG. 3 is a transmission electron microscope (TEM) image of the positive active material prepared in Example 1.

Referring to FIG. 3, it may be concluded that the lithium metal oxide core included in the positive active material manufactured in Example 1 maintained its monoclinic structure. A thickness of the non-conductive carbonaceous film included in the positive active material manufactured in Example 1 was thinly formed at a thickness of about 0.7 nm.

Figure 4A:
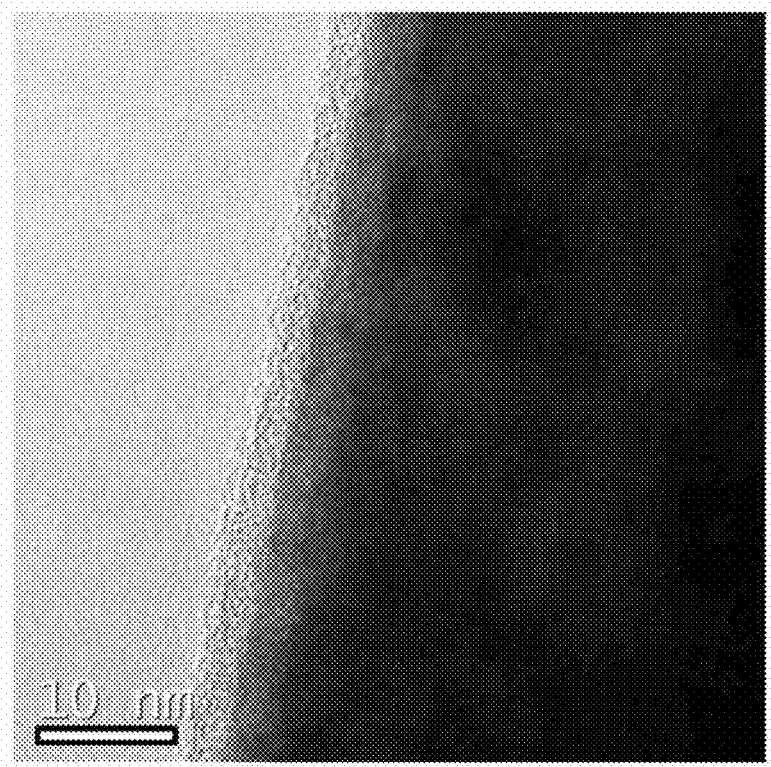
FIG. 4A shows a TEM image of the positive active material prepared in Example 9.

Referring to FIG. 4A, it was confirmed that even the lithium metal oxide core of the positive active material prepared in Example 9 retained its layered structure. Also, it was confirmed that the non-conductive carbonaceous film included in the positive active material prepared in Example 9 uniformly had a small thickness of about 3.0 nm.

Figure 4B:
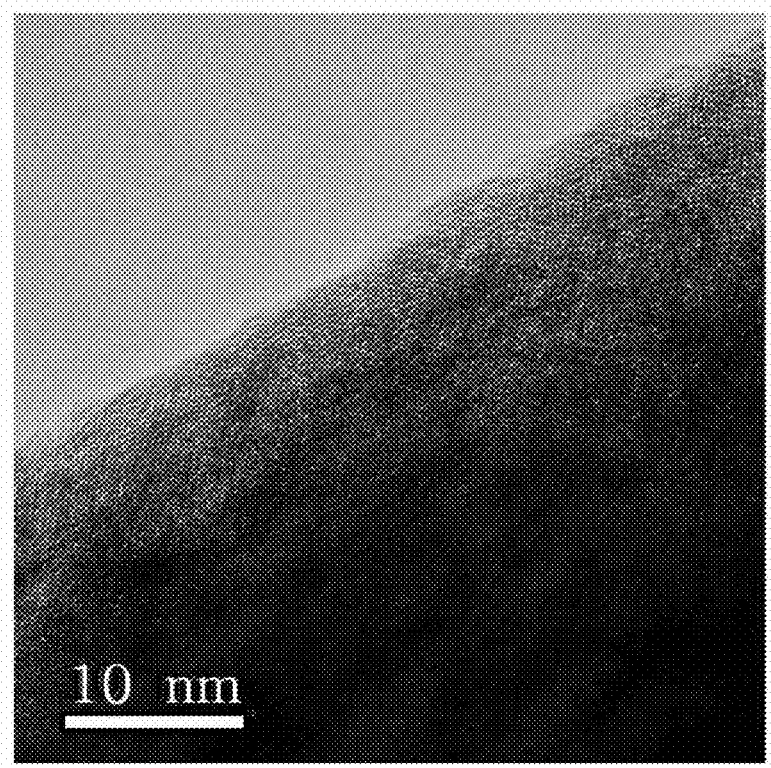
FIG. 4B shows a TEM image of the positive active material prepared in Comparative Example 5.

Referring to FIG. 4B, it was confirmed that a non-conductive carbonaceous film was not formed on the surface of the positive active material prepared in Comparative Example 5.

Analysis Example 2: X-Ray Photoelectron Spectroscopy (XPS) and Element Analysis (EA)

Double-sided tapes were adhered to a metal plate, and the positive active materials manufactured in Examples 1 to 3 and Comparative Examples 1 and 2 were used as samples. Each sample was sprayed until the double-sided tapes were covered entirely, and then the surfaces thereof were flattened and then pressed on a folder to immobilize them. As a light source for the analysis, monochromatic Al-Kα rays (1486.6 eV, 27.7 W, the analyzed surface area having a diameter of 0.1 mm and a discharging angle of 45 degrees by using an X-ray photoelectron spectroscopy, XPS, Physical Electronics, Quantum 2000 Scanning ESCAMicroprobe) were used to calculate a spectrum at a core level of O1s. The results are shown in FIG. 5.

Referring to FIG. 5, it may be concluded that carbon compounds having —C(=O)OH and —C=O groups exist on the surfaces of the positive active materials manufactured in Example 1 to 3 and Comparative Example 2 and that the amounts of the carbon compounds having C(=O)OH and —C=O groups are from the smallest to the greatest in the order of Example 1, Example 2, Example 3, and Comparative Example 2.

Also, the amounts of carbon in the non-conductive carbonaceous films on the positive active materials of Example 1 to 3, and Comparative Example 1 and 2 were measured by using an element analyzer (model name: FLASH 2000, a product of Thermo Scientific). The results are shown in Table 2 below.

In this regard, a peak intensity at a binding energy of 528 eV to 530 eV indicates the existence of nickel oxide, cobalt oxide, or manganese oxide, and a peak intensity at a binding energy of 531 eV to 533 eV indicates the existence of a carbon compound having —C(=O)OH and —C=O groups. A "cps" unit of the peak intensity below refers to "counts per second".

TABLE 2

| | A peak intensity at a binding energy of 528 eV to 530 eV ($I_A$, cps) | A peak intensity at a binding energy of 531 eV to 533 eV ($I_B$, cps) | Amount of carbon in a non-conductive carbonaceous film based on 100 parts by weight of the core (D, parts by weight) |
|---|---|---|---|
| Example 1 | 1718.29 | 2199.71 | 0.014 |
| Example 2 | 1581.35 | 1753.11 | 0.036 |
| Example 3 | 2025.94 | 2410.71 | 0.078 |
| Comparative Example 1 | 2921.83 | 1730.34 | — |
| Comparative Example 2 | 2044.21 | 2553.28 | 0.178 |

Referring to Table 2, it may be concluded that the amount of carbon in the non-conductive carbonaceous film on the positive active material surface is from the smallest to the greatest in the order of Comparative Example 1, Example 1, Example 2, Example 3, and Comparative Example 2.

This coincides with the fact that the amount of the non-conductive carbonaceous film on the surface of the metal oxide core increases in the order of Comparative Example 1, Example 1, Example 2, Example 3, and Comparative Example 2, according to the increase in the amounts of the carbonaceous precursor in the order of Comparative Example 1, Example 1, Example 2, Example 3, and Comparative Example 2, which are 0, 0.02, 0.04, 0.1, and 0.2 part by weight, respectively, based on 100 parts by weight of the lithium metal oxide core included in the positive active material.

Also, when the amounts of the positive active materials of Example 1, Example 2, and Example 3 are calculated according to the conditions of Inequation 1, the amounts are 55.80 parts by weight$^{-1}$, 25.06 parts by weight$^{-1}$, and 10.77 parts by weight$^{-1}$, respectively, which corresponds to 10 parts by weight$^{-1}$ or greater, which satisfies Inequation 1 below. However, when the positive active material of Comparative Example 3 is calculated according to the conditions of Inequation 1 below, the amount is 4.50 parts by weight$^{-1}$, which is less than 10 parts by weight$^{-1}$ and does not satisfy Inequation 1.

$$[(I_A/I_B)/D] \geq 10 \text{ parts by weight}^{-1} \quad \text{Inequation 1}$$

Spectra of the positive active materials prepared in Examples 7 to 9 and Comparative Example 5 at a C1s core level and at a O1s core level were obtained by using the same X-ray photoelectron spectroscope. Results thereof are shown in Table 3, FIG. 7A, and FIG. 7B.

TABLE 3

| | Peak Intensity at a binding energy of 282 eV to 285 eV ($I_C$, cps) | Peak Intensity at a binding energy of 288 eV to 293 eV ($I_D$, cps) | $I_D/I_C$ |
|---|---|---|---|
| Example 7 | 730 | 565 | 0.77 |
| Example 8 | 1025 | 682 | 0.66 |
| Example 9 | 1010 | 736 | 0.72 |
| Comparative Example5 | 832 | 135 | — |

Figure 7A:
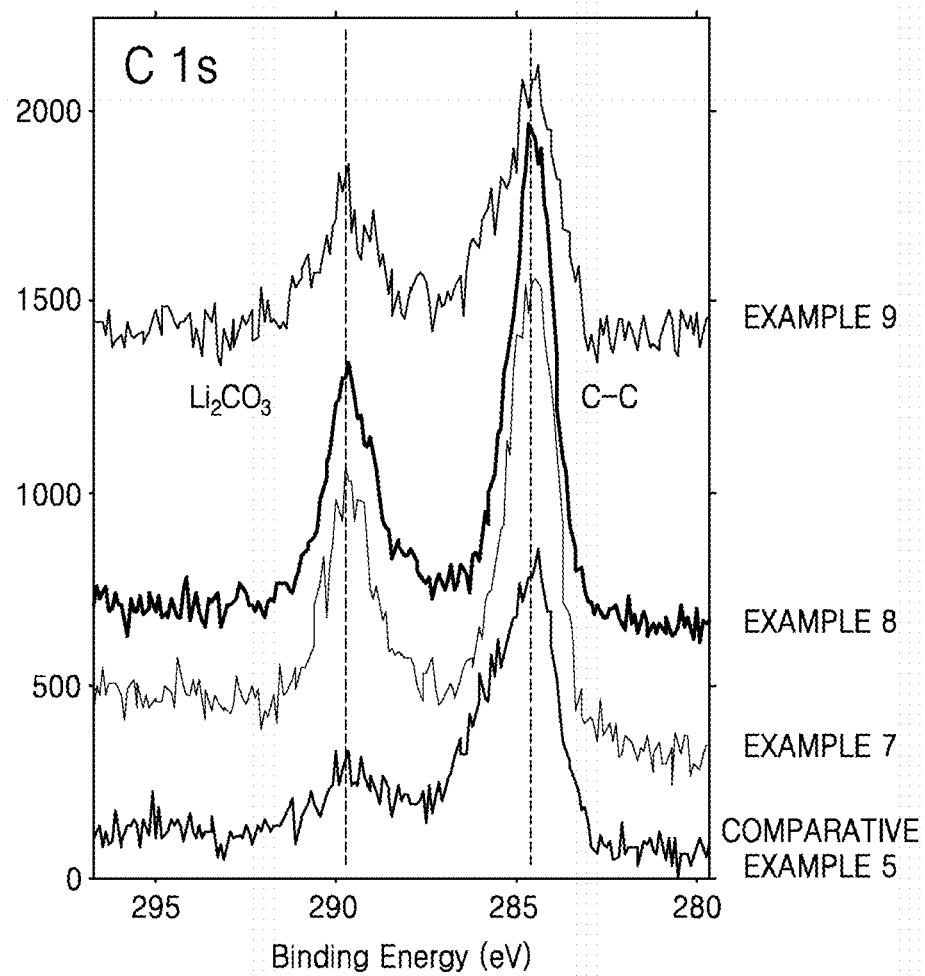
FIG. 7A shows a C1s spectrum of X-ray photoelectron spectroscopy (XPS) analysis on surfaces of the positive active materials prepared in Examples 7 to 9 and Comparative Example 5.

Referring to Table 3 and FIG. 7A, the peak intensity at the binding energy of 282 eV to 285 eV indicates a C—C bond phase, and the peak intensity at the binding energy of 288 eV to 293 eV indicates a $Li_2CO_3$ phase. From this result, it was confirmed that the positive active materials prepared in Examples 7 to 9 included $Li_2CO_3$ on their surfaces, and their $I_D/I_C$ were 0.77, 0.66, and 0.72, respectively. That is, the ratios of $ID/I_C$ were all 0.3 or more.

Referring to FIG. 7B, it was confirmed that a carbon compound having —C(=O)OH and —C=O was absent on the surface of the positive active material prepared in Comparative Example 5, and was present on the surface of the positive active materials prepared in Examples 7 to 9. The positive active material prepared in Example 9 had a greater carbon compound content than the positive active material prepared in Example 8, which had a greater carbon compound content than the positive active material prepared in Example 7.

Analysis Example 3: Energy Dispersive Spectroscopy (EDS) Analysis

Energy Dispersive Spectroscopy (EDS) analysis was performed with respect to the surfaces of the positive active materials prepared in Example 3 and Comparative Example 1. The results are shown in FIGS. 8A and 8B.

Figure 8A:
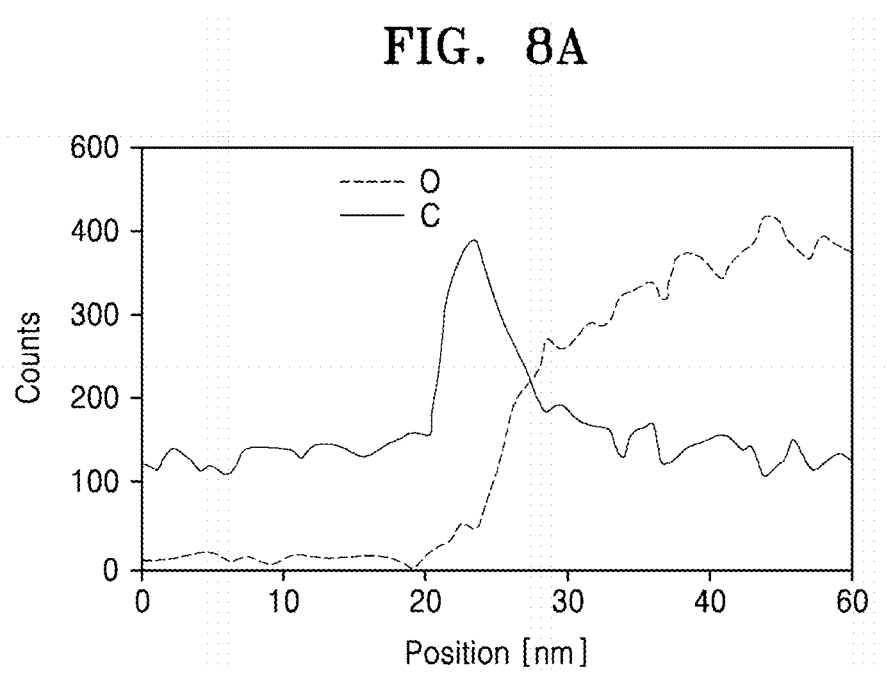
FIG. 8A shows energy dispersive spectroscopy (EDS) analysis spectra of the positive active material manufactured in Example 3.
Figure 8B:
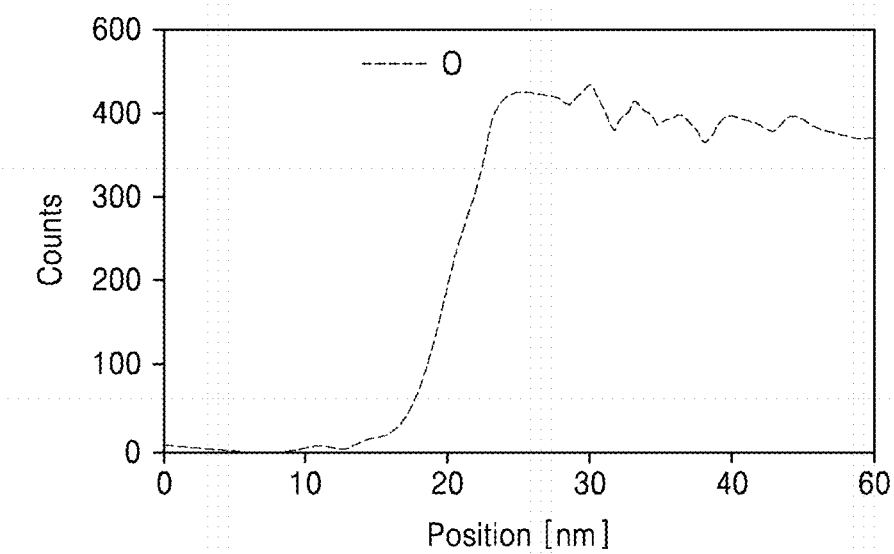
FIG. 8B shows energy dispersive spectroscopy (EDS) analysis spectra of the positive active material manufactured in Comparative Example 1.

Referring to FIGS. 8A and 8B, the positive active material prepared in Example 3 showed a decrease in the amount of oxygen in the direction from the lithium metal oxide core to the surface of the positive active material. Meanwhile, the positive active material prepared in Comparative Example 1 did not include carbon. As a result, it may be concluded that a non-conductive carbonaceous film was formed due to the carbonization of the positive active material prepared in Example 3 by oxygen generated from the reduction of the core surface through first and second heat treatments.
Evaluation of Battery Characteristics

Evaluation Example 1: Evaluation of Initial Efficiency, Capacity and Lifespan Characteristics of Lithium Battery The coin-type lithium half-cells manufactured in Example 15 and Comparative Example 7 were charged at room temperature (25° C.) at 0.05 C until 4.4 V was reached. Then, the coin-type half-cells were galvanostatically discharged at 0.05 C until a cut-off voltage of 2.5 V was reached. At this point, a charge capacity and discharge capacity in the first cycle were measured and the initial efficiency (a ratio of the discharge capacity in the first cycle to the charge capacity in the first cycle) was calculated therefrom.

Thereafter, each of the coin-type half-cells was charged at 0.5 C as described above and then discharged at 0.5 C until 2.5 V was reached. At this point, a charge capacity and a discharge capacity were measured and a charge and discharge efficiency (a ratio of a discharge capacity to a charge capacity in each cycle) was calculated therefrom. The charge and discharge processes were repeated and a discharge capacity in the $102^{th}$ cycle was measured to evaluate the lifespan characteristics of the coin-type lithium half-cells manufactured in Example 15 and Comparative Example 7. The lifespan characteristics were calculated from the capacity retention (%), calculated from Equation 1 below. The results are shown in Table 4 and FIGS. 9A to 9C below.

capacity retention(%)=[(discharge capacity at the $102^{th}$ cycle/discharge capacity at the $3^{rd}$ cycle)]×100      Equation 1

The coin-type lithium half-cells manufactured in Example 15 and Comparative Example 7 were charged at room temperature at 0.05 C until 4.45 V was reached. Thereafter, the coin-type half-cells were galvanostatically discharged at 0.05 C until a cut-off voltage of 2.5 V was reached. Then, the same method as described above was used to calculate an initial efficiency from the charge capacity and discharge capacity in the first cycle and then a charge and discharge efficiency was calculated from the charge capacities and the discharge capacities in subsequent cycles. The charge and discharge processes were repeated to measure the discharge capacity in the $102^{th}$ cycle to calculate capacity retention (%) from Equation 1. The results are shown in Table 4, and FIGS. 9A to 9C below.

The coin-type lithium half-cells manufactured in Example 15 and Comparative Example 7 were charged at room temperature (25° C.) at 0.05 C until 4.5 V was reached. Thereafter, the coin-type half-cells were galvanostatically discharged at 0.05 C until a cut-off voltage of 2.5 V was reached. Then, the same method as described above was used to calculate an initial efficiency from the charge capacity and discharge capacity in the first cycle and then a charge and discharge efficiency was calculated from the charge capacities and the discharge capacities in the subsequent cycles. The charge and discharge processes were repeated to measure the discharge capacity in the $102^{th}$ cycle to calculate the capacity retention (%) from Equation 1. The results are shown in Table 4 and FIGS. 9A to 9C below.

TABLE 4

| | Cut-off voltage (V) | Discharge capacity at the first cycle (mAh/g) | Initial efficiency (%) | Charge and discharge efficiency (%) | capacity retention (%) |
|---|---|---|---|---|---|
| Example 15 | 4.4 V~2.5 V | 203.01 | 94.84 | 99.89 | 99.36 |
| Comparative Example 7 | 4.4 V~2.5 V | 198.51 | 93.38 | 99.76 | 98.11 |
| Example 15 | 4.45 V~2.5 V | 209.01 | 94.51 | 99.83 | 99.34 |
| Comparative Example 7 | 4.45 V~2.5 V | 206.78 | 92.90 | 99.73 | 94.70 |
| Example 15 | 4.5 V~2.5 V | 214.46 | 93.56 | 99.80 | 97.31 |
| Comparative Example 7 | 4.5 V~2.5 V | 209.31 | 91.95 | 99.66 | 91.38 |

Figure 9A:
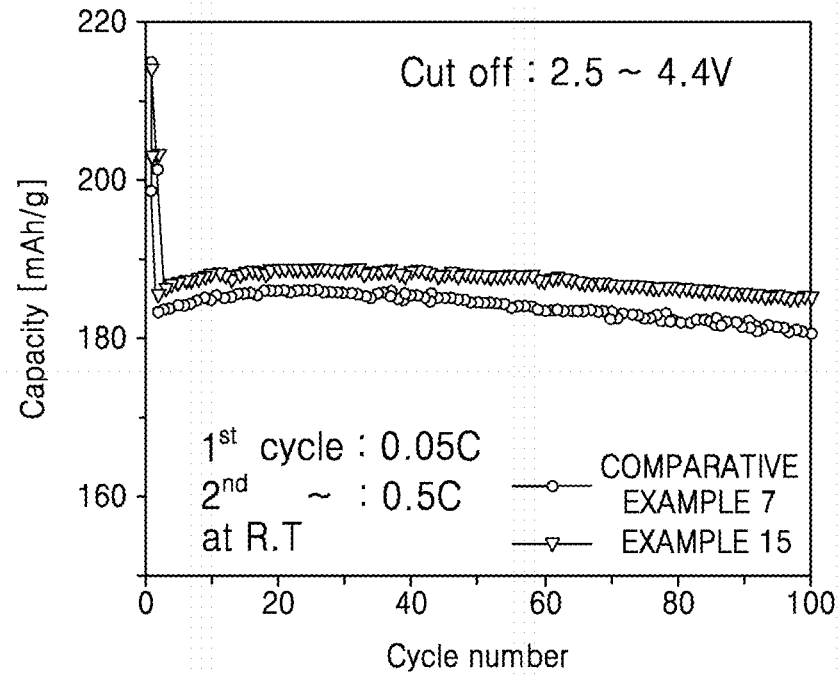
FIG. 9A is a graph showing a capacity with respect to the number of cycles of the lithium batteries manufactured in Example 15 and Comparative Example 7 charged and discharged at 0.05 C, at a cut-off voltage of 4.4 V to 2.5 V.
Figure 9B:
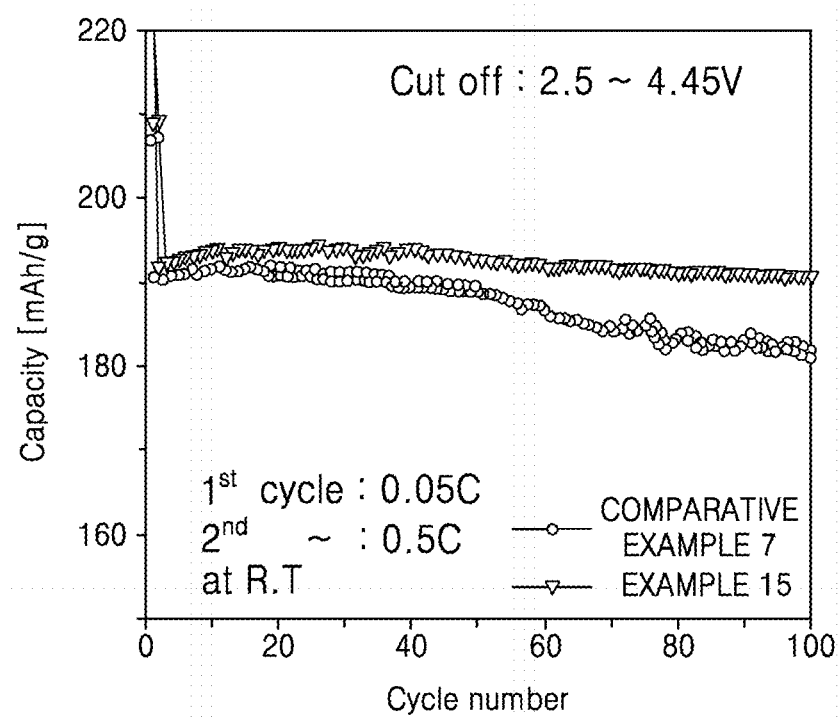
FIG. 9B is a graph showing a capacity with respect to the number of cycles of the lithium batteries manufactured in Example 15 and Comparative Example 7 charged and discharged at 0.05 C, at a cut-off voltage of 4.45 V to 2.5 V.
Figure 9C:
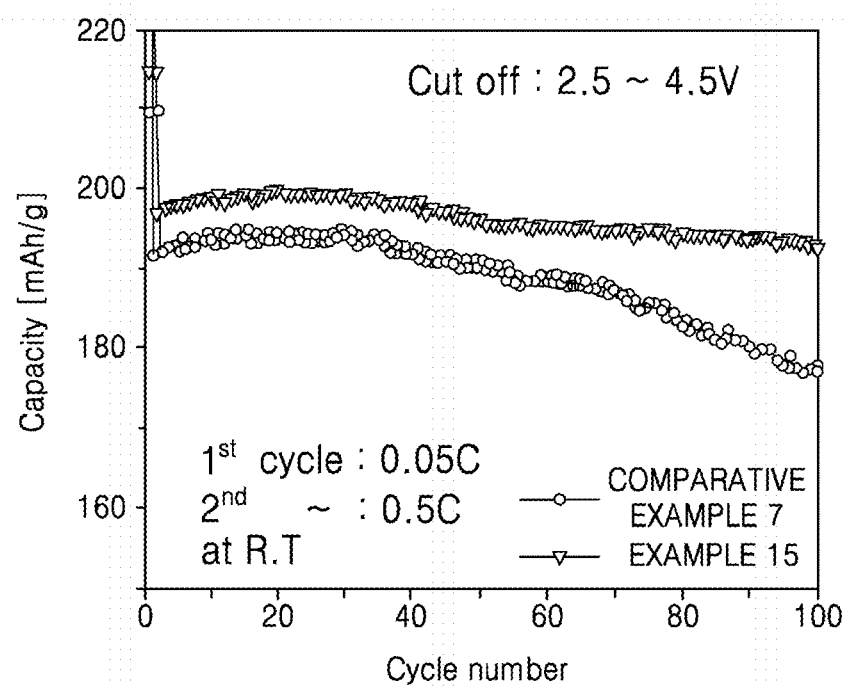
FIG. 9C is a graph showing a capacity with respect to the number of cycles of the lithium batteries manufactured in Example 15 and Comparative Example 7 charged and discharged at 0.05 C, at a cut-off voltage of 4.5 V to 2.5 V.

Referring to Table 4 and FIGS. 9A to 9C, the discharge capacity in the first cycle, the initial efficiency, the charge and discharge efficiency in the entire cycle, and the capacity retention of the coin-type lithium half-cell manufactured in Example 15 were better than the discharge capacity in the first cycle, the initial efficiency, the charge and discharge efficiency in the entire cycle, and the capacity retention of the coin-type lithium half-cell manufactured in Comparative Example 7 at a cut-off voltage (V) of 4.4 V to 2.5 V, 4.45 V to 2.5 V, and 4.5 V to 2.5 V. Also, when the cut-off voltage (V) was a high voltage of 4.5 V to 2.5 V, the capacity retention of the coin-type lithium half-cell manufactured in Example 15 was better than the capacity retention of the coin-type lithium half-cell manufactured in Comparative Example 7.

Meanwhile, the coin-type lithium half-cells manufactured in Examples 14 to 19 and Comparative Examples 7 to 10 were charged at room temperature at 0.05 C until 4.4 V was reached. Thereafter, the coin-type half-cells were galvanostatically discharged at 0.05 C until cut-off voltage of 2.5 V was reached. At this point, a discharge capacity (a discharge capacity of the first cycle) was measured.

Thereafter, the coin-type half-cells were charged at 0.5 C as described above and then discharged at 0.5 C until 2.5 V was reached. At this point, a discharge capacity was measured, and the charge and discharge processes were repeated and then a discharge capacity in the $102^{th}$ cycle was measured to evaluate the lifespan characteristics of the coin-type lithium half-cells manufactured in Examples 14 to 19 and Comparative Examples 7 to 10. The lifespan characteristics were calculated from capacity retention (%) of Equation 1. The results are shown in Table 5, Table 6, and FIGS. 10A and 10B.

TABLE 5

|  | Discharge capacity at the first cycle (mAh/g) | Initial efficiency (%) | Capacity retention (%) |
| --- | --- | --- | --- |
| Example 14 | 202.45 | 95.10 | 98.39 |
| Example 15 | 203.01 | 94.84 | 99.36 |
| Example 16 | 196.16 | 92.57 | 102.41 |
| Comparative Example 8 | 199.48 | 90.76 | 96.23 |
| Comparative Example 9 | 180.00 | 87.62 | 101.16 |
| Comparative Example 10 | 133.59 | 67.25 | 114.91 |

TABLE 6

|  | Discharge capacity at the first cycle (mAh/g) | Initial efficiency (%) | Capacity retention (%) |
| --- | --- | --- | --- |
| Example 15 | 203.01 | 94.84 | 99.36 |
| Example 17 | 196.66 | 94.04 | 99.80 |
| Example 18 | 204.86 | 95.01 | 97.87 |
| Example 19 | 198.05 | 93.16 | 99.52 |
| Comparative Example 7 | 198.51 | 93.38 | 98.11 |

Figure 10A:
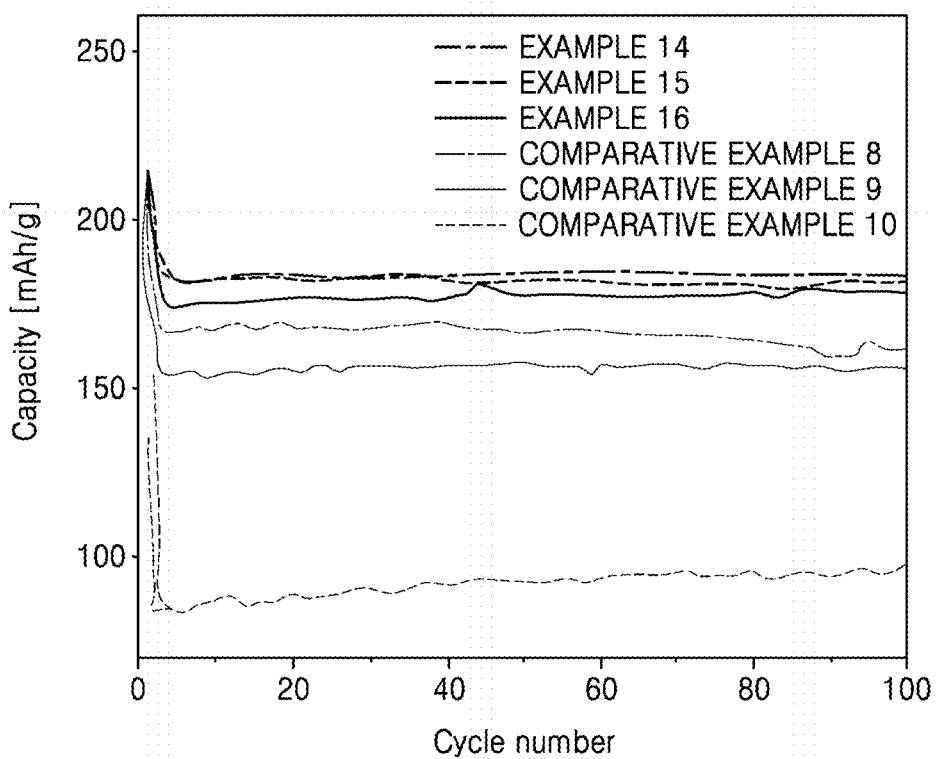
FIG. 10A is a graph showing a capacity with respect to the number of cycles of the lithium batteries manufactured in Examples 14 to 16 and Comparative Examples 8 to 10 charged and discharged at 0.5 C, at a cut-off voltage of 4.4 V to 2.5 V.

Referring to Table 5 and FIG. 10A, the coin-type lithium half-cells manufactured in Examples 14 to 16 showed better discharge capacity and initial efficiency than the coin-type lithium half-cells manufactured in Comparative Examples 8 to 10. In other words, the discharge capacity and capacity retention of the coin-type lithium half-cell including the positive active material in which the amount of carbon in the non-conductive carbonaceous film was 0.1 parts by weight or less based on 100 parts by weight of the lithium metal oxide core showed better discharge capacity and initial efficiency than the coin-type lithium half-cell including the positive active material in which the amount of carbon in the non-conductive carbonaceous film exceeded 0.1 parts by weight based on 100 parts by weight of the lithium metal oxide core. The reason for the excellent capacity retention of the coin-half cells manufactured in Comparative Examples 8 to 9 is because a thick non-conductive carbonaceous film decreases a charge and discharge speed of lithium ions to decrease a potential capacity, and thus, the capacity retention appears as if it increased.

Figure 10B:
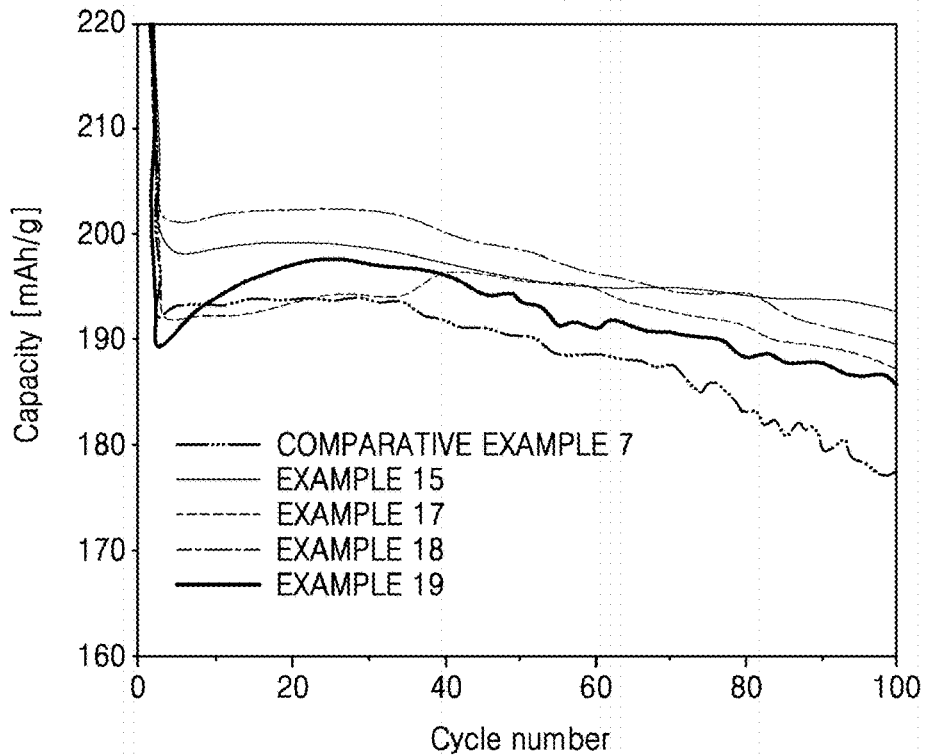
FIG. 10B is a graph showing a capacity with respect to the number of cycles of the lithium batteries manufactured in Examples 15, 17, and 19, and Comparative Example 7 charged and discharged at 0.5 C, at a cut-off voltage of 4.4 V to 2.5 V.

Referring to Table 6 and FIG. 10B, the coin-type lithium half-cells manufactured in Examples 15 and 17 to 19 showed better discharge capacity and capacity retention than the coin-type lithium half-cell manufactured in Comparative Example 7. Also, during the second heat treatment for forming the non-conductive carbonaceous film on the surface of the lithium metal oxide core, the coin-type lithium half-cell heat-treated at a temperature of about 600° C. to about 700° C. showed better discharge capacity, initial efficiency, and capacity retention.

The coin-type lithium half cells manufactured in Examples 20 to 25 and Comparative Example 11 were charged at room temperature (25° C.) at a rate of 0.05 C until 4.5 V was reached. Then, the coin-type lithium half cells were discharged with a constant current at a rate of 0.05 C until a cut-off voltage reached 2.0 V. The charge capacity and discharge capacity (discharge capacity in the $1^{st}$ cycle) of the coin-type lithium half cells were measured.

Then, the coin-type lithium half cells were charged at a rate of 1.0 C in the same charging conditions described above, and then, discharged at a rate of 1.0 C until 2.0 V was reached. This cycle of charging and discharging was repeated, and differential capacity of the coin-type lithium half cells manufactured in Example 22 and Comparative Example 11 was measured in the $9^{th}$ cycle, and delta voltage (ΔV) and discharge capacity of the coin-type lithium half cells manufactured in Example 20 to 25 and Comparative Example 11 were measured up to the $50^{th}$ cycle. Based on the obtained results, lifespan characteristics were evaluated. The lifespan characteristics were obtained by calculating a capacity retention (%) defined in Equation 2 below. Results thereof are shown in FIGS. 11, 12A, 12B, 13A, and 13B, and Table 7.

Capacity retention(%)=[(discharge capacity in $50^{th}$ cycle/discharge capacity in $1^{st}$ cycle)]×100  Equation 2

Figure 11:
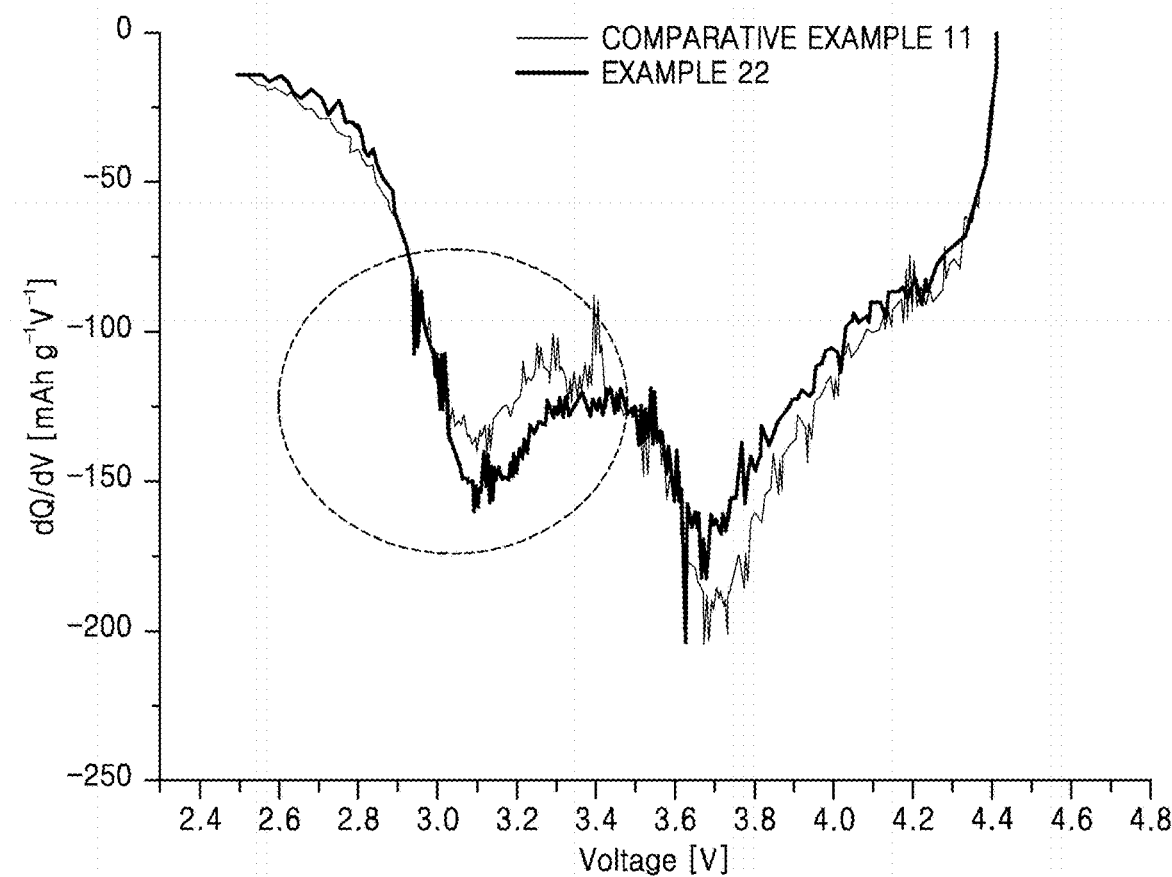
FIG. 11 shows a graph of a differential capacity (dQ/dV) with respect to a voltage in a $9^{th}$ cycle when lithium batteries prepared in Example 22 and Comparative Example 11 are charged and discharged at a rate of 1 C and at a cut-off voltage of 2.0 V to 4.5 V.

Referring to FIG. 11, in the case of the coin-type lithium half cells manufactured in Example 22 and Comparative Example 11, a $Li_2MnO_3$ discharge capacity peak is shown around 3.1 V (the oval dotted line). When the $Li_2MnO_3$ discharge capacity peak was taken into consideration, it was confirmed that the coin-type lithium half cell manufactured in Example 22 had a higher $Li_2MnO_3$ discharge capacity than the coin-type lithium half cell manufactured in Comparative Example 11.

TABLE 7

|  | Delta voltage (ΔV, mV) | Capacity retention (%) |
| --- | --- | --- |
| Example 20 | 73.2 | 93.31 |
| Example 21 | 71.6 | 93.72 |
| Example 22 | 66.3 | 93.98 |
| Example 23 | 55.9 | 93.79 |
| Example 24 | 73.8 | 92.46 |
| Example 25 | 71.2 | 91.60 |
| Comparative Example 11 | 80.3 | 92.38 |

Figure 12A:
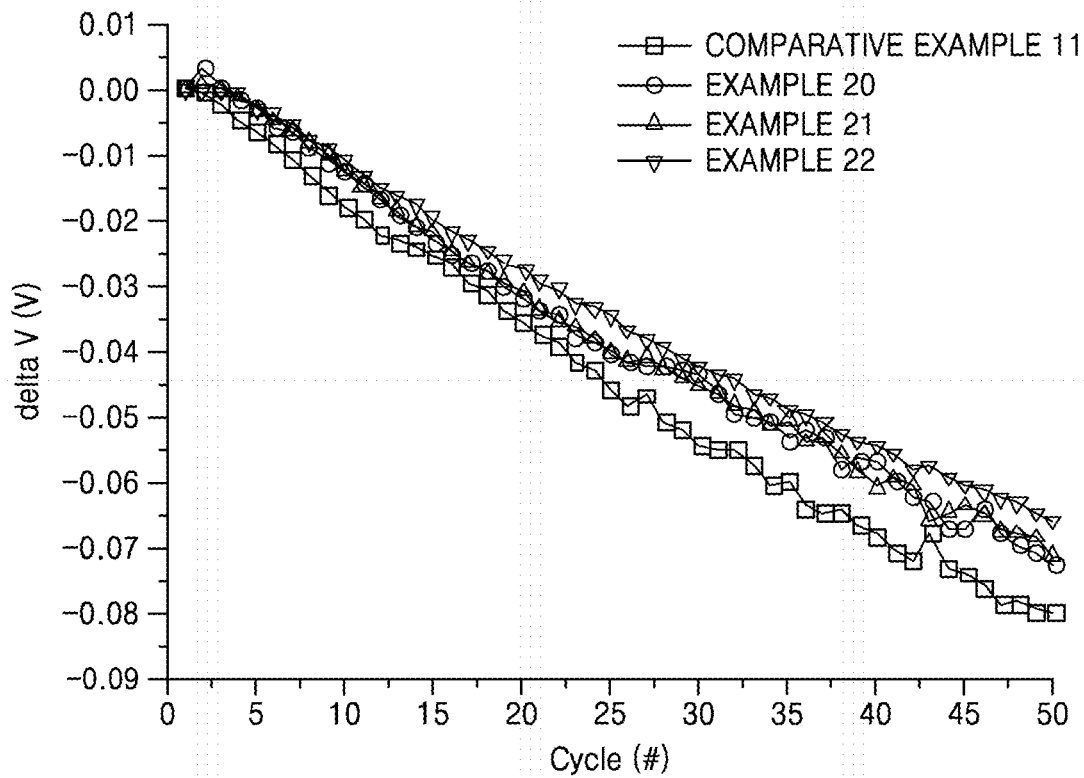
FIG. 12A shows a graph of a delta voltage (ΔV) with respect to the number of cycles when lithium batteries prepared in Examples 20 to 22 and Comparative Example 11 are charged and discharged at a rate of 1 C and at a cut-off voltage of 2.0 V to 4.5 V.
Figure 12B:
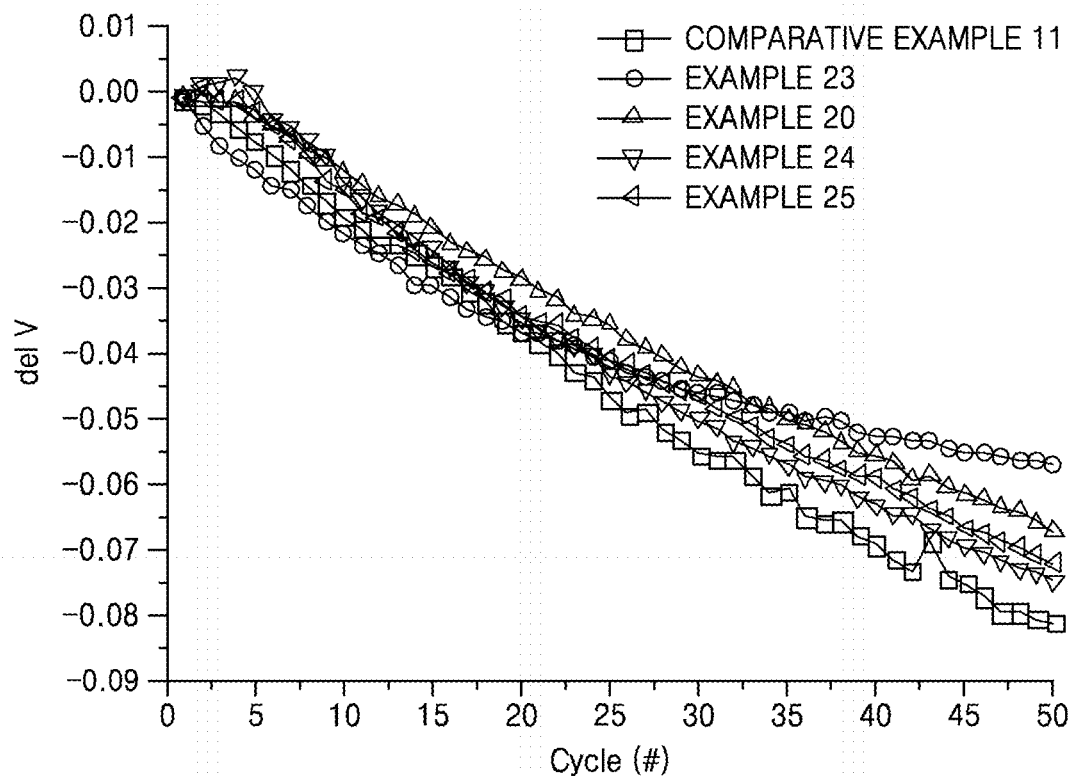
FIG. 12B shows a graph of a delta voltage (ΔV) with respect to the number of cycles when lithium batteries prepared in Examples 20, 23 to 25 and Comparative Example 11 are charged and discharged at a rate of 1 C and at a cut-off voltage of 2.0 V to 4.5 V.

Referring to Table 7, and FIGS. 12A and 12B, the coin-type lithium half cells manufactured in Examples 20 to 25 has a smaller delta voltage (ΔV) than that of the coin-type lithium half cell manufactured in Comparative Example 11. From among the coin-type lithium half cells manufactured in Examples 20 to 25, the coin-type lithium half cells manufactured in Examples 22 and 23 in which the second heat treatment was performed at a temperature of 500° C. had much smaller delta voltage (ΔV).

Figure 13A:
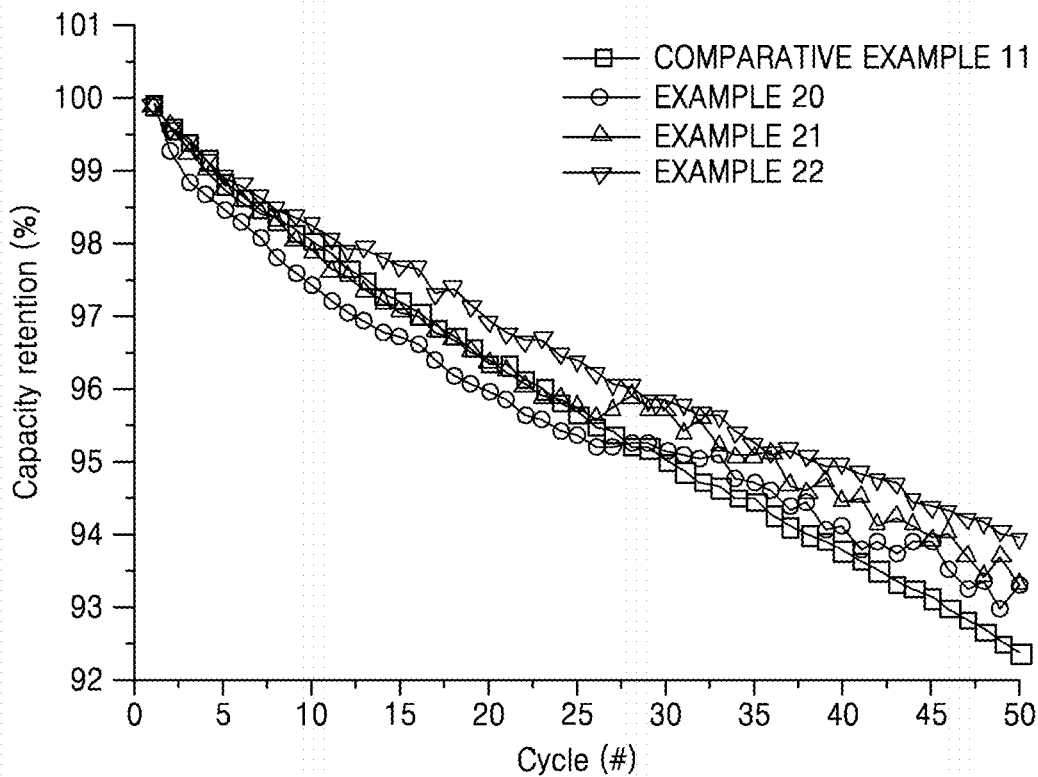
FIG. 13A shows a graph of capacity retention with respect to the number of cycles when lithium batteries prepared in Examples 20 to 22 and Comparative Example 11 are charged and discharged at a rate of 1 C and at a cut-off voltage of 2.0 V to 4.5 V.
Figure 13B:
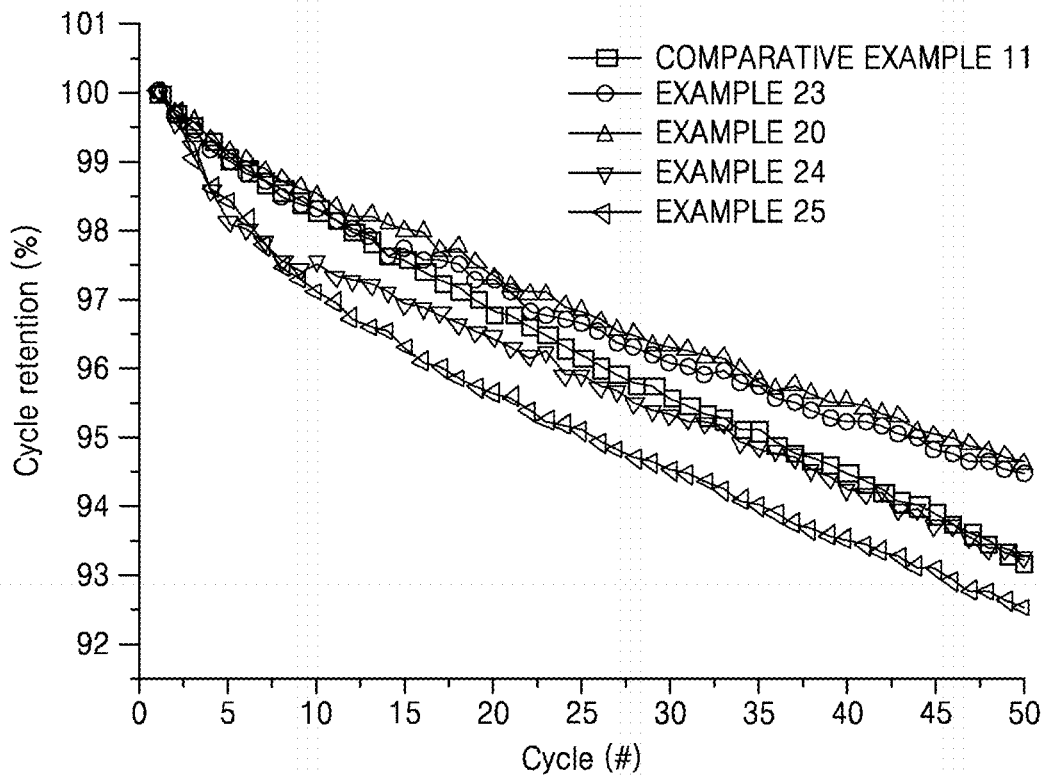
FIG. 13B shows a graph of capacity retention with respect to the number of cycles when lithium batteries prepared in Examples 20, and 23 to 25 and Comparative Example 11 are charged and discharged at a rate of 1 C and at a cut-off voltage of 2.0 V to 4.5 V.
Figure 14:
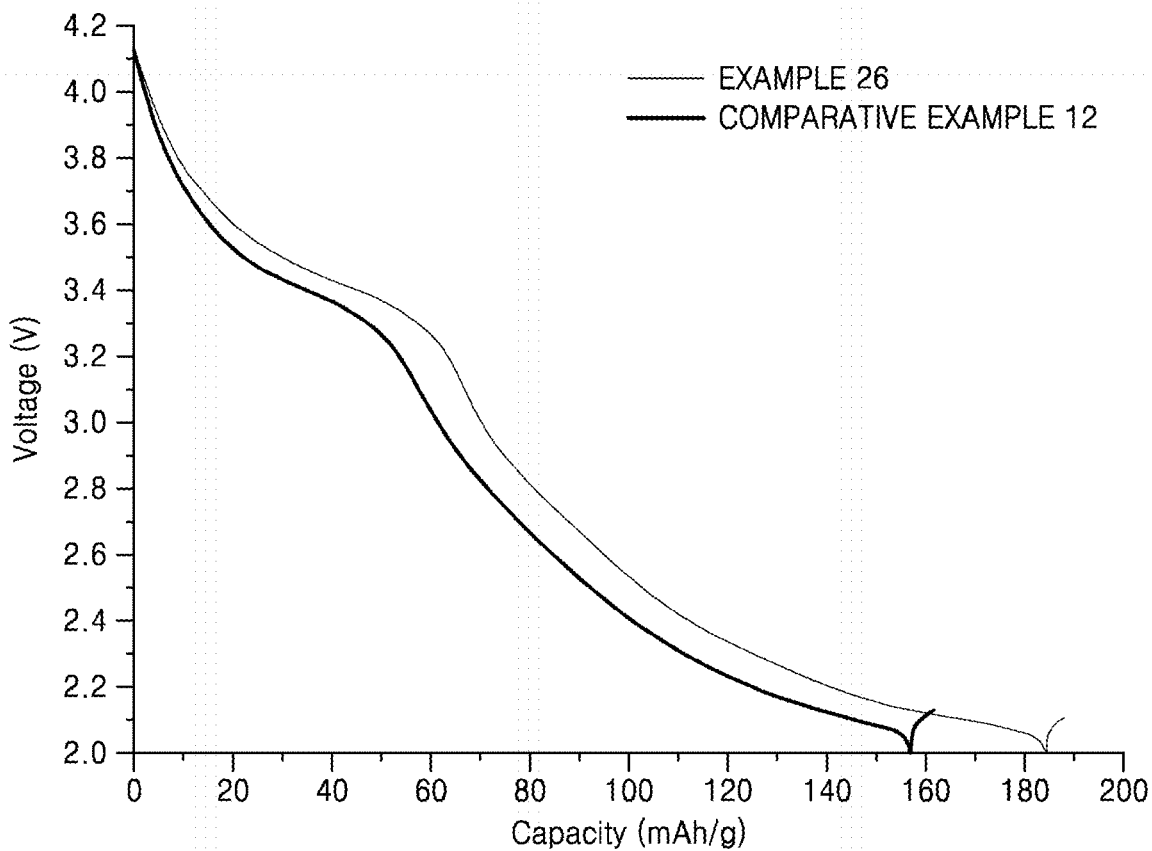
FIG. 14 is a graph showing a capacity of the sodium batteries manufactured in Example 26 and Comparative Example 12 charged and discharged once at a constant current of 0.1 C in a voltage range from about 2.0 V to about 4.2 V relative to sodium metal.
Figure 15:
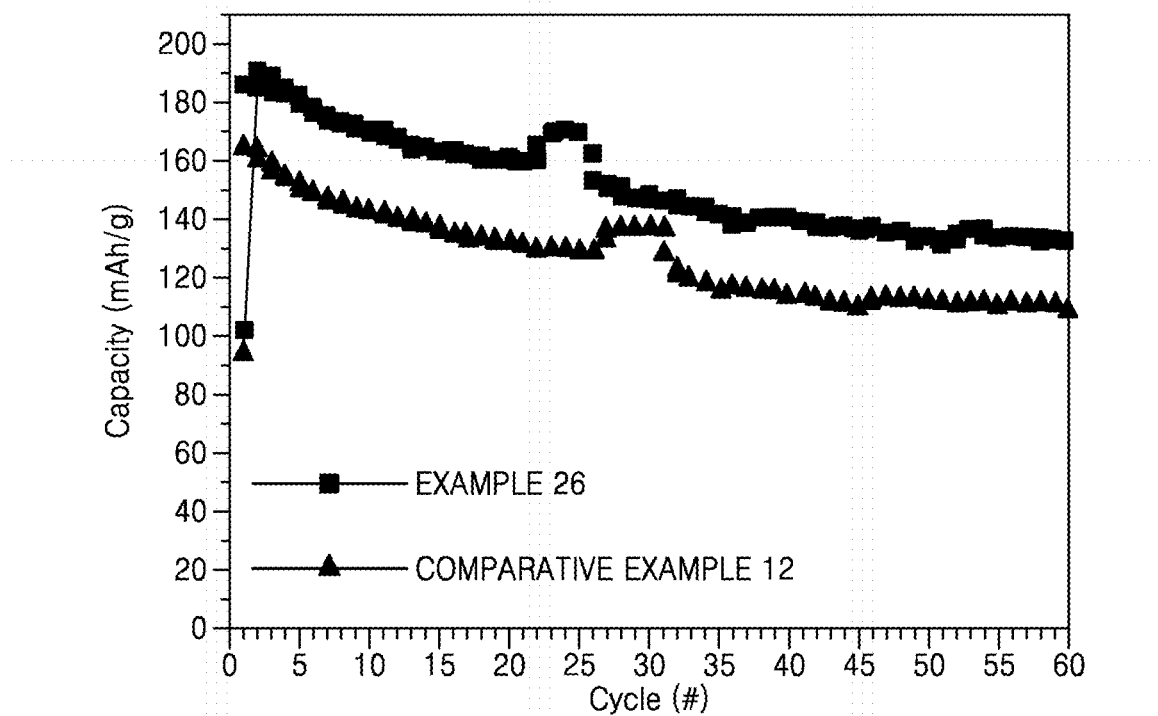
FIG. 15 is a graph showing a capacity with respect to the number of cycles of the sodium batteries manufactured in Example 26 and Comparative Example 12 charged and discharged at a constant current of 0.1 C in a voltage range from about 2.0 V to about 4.2 V relative to sodium metal.

Referring to Table 7, and FIGS. 13A and 13B, the coin-type lithium half cells manufactured in Examples 20 to 24 had a greater capacity retention than that of the coin-type lithium half cell manufactured in Comparative Example 11. From among the coin-type lithium half cells manufactured in Examples 20 to 24, the coin-type lithium half cells manufactured in Examples 22 and 23 in which the second heat treatment was performed at a temperature of 500° C. had a much greater capacity retention.

Evaluation Example 2: Evaluation of Capacity and Lifespan Characteristics of Sodium Battery The coin-type sodium half-cells manufactured in Example 26 and Comparative Example 12 were charged once at room temperature at the constant current of 0.1 C in a voltage range from about 2.0 V to about 4.2 V relative to sodium metal. The charge capacity and discharge capacity (the discharge capacity in the first cycle) were measured. Then, the charge and discharge processes were repeated to measure the discharge capacity respectively up to the 60$^{th}$ cycle. The lifespan characteristics of the coin-type sodium half-cells manufactured in Example 26 and Comparative Example 12 were evaluated on the basis of the discharge capacity in the fiftieth cycle. The lifespan characteristics were calculated from the capacity retention (%), calculated from the Equation 2 below. The results are shown in Table 8 and FIGS. 9 and 10 below.

TABLE 8

|  | Discharge capacity at the first cycle (mAh/g) | Capacity retention (%) |
| --- | --- | --- |
| Example 26 | 186 | 71.5 |
| Comparative Example 12 | 164.47 | 68.3 |

Referring to Table 8 and FIGS. 9 and 10, the coin-type sodium half-cells manufactured in Example 26 showed better discharge capacity in the first cycle and capacity retention than the discharge capacity in the first cycle and capacity retention of the coin-type sodium half-cell manufactured in Comparative Example 12.

As described above, according to the one or more of the above embodiments, a positive active material includes a core comprising a metal oxide, a non-metal oxide, or a combination thereof capable of intercalation and deintercalation of lithium ions or sodium ions and a non-conductive carbonaceous film containing oxygen on at least one portion of the surface of the core. Thus, a secondary battery including the positive active material may have improved initial efficiency, capacity, and lifespan characteristics.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A positive active material comprising:
   a core comprising a sodium metal oxide capable of intercalation and deintercalation of sodium ions; and
   a non-conductive carbonaceous film containing oxygen on at least one portion of a surface of the core,
   wherein the non-conductive carbonaceous film comprises at least one carbon compound having a functional group of the formula —C(═O)Ra, —C(═O)ORa, or —OC(═O)ORa, wherein Ra is hydrogen, a C1-C10 alkyl group, or a substituted or an unsubstituted C6-C20 aryl group, wherein the substituent comprises a hydroxy group, a nitro group, a cyano group, an amino group, an amidino group, a hydrazine, a hydrazone, a carboxyl group or a salt thereof, a sulfonic acid group or a salt thereof, a phosphoric acid or a salt thereof, a C1-C20 alkyl group, a C2-C20 alkenyl group, a C2-C20 alkynyl group, a C1-C20 heteroalkyl group, a C6-C20 aryl group, a C6-C20 arylalkyl group, a C6-C20 heteroaryl group, a C6-C20 heteroarylalkyl group, or a C1-C20 alkyl group substituted with a halogen atom, and
   wherein the core is represented by Formula 4 below, and the non-conductive carbonaceous film containing oxygen is disposed on at least one portion of the surface of the core $Na_xQa_zQb_vO_{2+d}$  Formula 4 wherein in Formula 4,
   Qa is Fe, Ru, Os, Cr, Mo, W, or a combination thereof
   Qb is at least one of Groups 4, 5, 7, 9, or 10 of the periodic table, and
   0.5≤x<1, 0.3≤z≤0.5, 0.5≤v≤0.7, z+v=1, and −0.3≤d<1.

2. The positive active material of claim 1, wherein Qa is Fe or Cr,
   Qb is Mn, Co, Ni, V, Ti, or a combination thereof, and
   0.5≤x<1, 0.3≤z≤0.5, 0.5≤v≤0.7, z+v=1, and −0.3≤d<1.

3. The positive active material of claim 1, wherein the core is represented by Formula 6 below:

$Na_xFe_zQb_vO_2$ 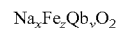 Formula 6 wherein in Formula 6,
   Qb is Mn or Ni, and
   0.5≤x<1, 0.3≤z≤0.5, z+v=1, and 0.5≤v≤0.7.

4. The positive active material of claim 1, further comprising an oxygen depletion layer on the at least one portion of the surface of the core and disposed between the core and the non-conductive carbonaceous film.

5. The positive active material of claim 4, wherein the oxygen depletion layer is a layer formed by reduction of the at least one portion of the surface of the core.

6. A secondary battery comprising:
   a positive electrode;
   an electrolyte; and
   a negative electrode, wherein
   the positive electrode comprises the positive active material according to claim 1.

7. A method of preparing of the positive active material according to claim 1, the method comprising:
   mixing a core comprising a sodium metal oxide capable of intercalation and deintercalation of sodium ions, a carbonaceous precursor having at least one hydroxy group or carboxyl group, and a solvent to chemically adsorb the carbonaceous precursor on at least one portion of the surface of the core; and heat treating the core on which the carbonaceous precursor is formed to form a non-conductive carbonaceous film containing oxygen on the core to prepare the positive active material, wherein the non-conductive carbonaceous film comprises at least one carbon compound having a functional group of the formula —C(═O)Ra, —C(═O)ORa, or —OC(═O)ORa, wherein Ra is hydrogen, a C1-C10 alkyl group, or a substituted or unsubstituted C6-C20 aryl group, wherein the substituent comprises a hydroxy group, a nitro group, a cyano group, an amino group, an amidino group, a hydrazine, a hydrazone, a carboxyl group or a salt thereof, a sulfonic acid group or a salt thereof, a phosphoric acid or a salt thereof, a C1-C20 alkyl group, a C2-C20 alkenyl group, a C2-C20 alkynyl group, a C1-C20 heteroalkyl group, a C6-C20 aryl group, a C6-C20 arylalkyl group, a C6-C20 heteroaryl group, a C6-C20 heteroarylalkyl group, or a C1-C20 alkyl group substituted with a halogen atom, and wherein the core is represented by Formula 4 below, and the non-conductive carbonaceous film containing oxygen is disposed on at least one portion of the surface of the core $$Na_xQa_zQb_vO_{2+d} \qquad \text{Formula 4}$$

wherein in Formula 4,

Qa is Fe, Ru, Os, Cr, Mo, W, or a combination thereof,

Qb is at least one of Groups 4, 5, 7, 9, or 10 of the periodic table, and $0.5 \leq x < 1$, $0.3 \leq z \leq 0.5$, $0.5 \leq v \leq 0.7$, $z+v=1$, and $-0.3 \leq d < 1$.

8. The method of claim 7, wherein the process of chemically adsorbing the carbonaceous precursor on at least one portion of the surface of the core occurs via a chemical bond formed by a dehydration reaction between a hydroxy group of the surface of the core and a hydroxy group or a carboxyl group of the carbonaceous precursor.

9. The method of claim 8, wherein the dehydration reaction further includes a heat treatment process.

10. The method of claim 9, wherein the heat treatment process is performed at a temperature of about 200° C. to about 400° C. for about 1 hour to about 5 hours.

11. The method of claim 7, wherein the heat treating is performed at a temperature of about 400° C. to about 800° C.

* * * * *